(12) United States Patent
Handelman

(10) Patent No.: US 7,474,827 B2
(45) Date of Patent: Jan. 6, 2009

(54) DEVICES AND METHODS FOR ALL-OPTICAL PROCESSING AND STORAGE

(75) Inventor: Doron Handelman, Givatayim (IL)

(73) Assignee: Rondel Technology Facility, L.L.C., Wilmington, DE (US)

(*) Notice: Subject to any disclaimer, the term of this patent is extended or adjusted under 35 U.S.C. 154(b) by 13 days.

(21) Appl. No.: 11/562,156

(22) Filed: Nov. 21, 2006

(65) Prior Publication Data

US 2007/0104451 A1 May 10, 2007

Related U.S. Application Data

(62) Division of application No. 10/619,413, filed on Jul. 16, 2003, now Pat. No. 7,167,620.

(51) Int. Cl.
*G02B 6/00* (2006.01)

(52) U.S. Cl. .......................... 385/122; 385/31

(58) Field of Classification Search ............... None
See application file for complete search history.

(56) References Cited

U.S. PATENT DOCUMENTS

| | | |
|---|---|---|
| 4,626,075 A | 12/1986 | Chemla |
| 4,726,010 A | 2/1988 | Ali et al. |
| 4,837,855 A | 6/1989 | Hajikano et al. |
| 4,864,524 A | 9/1989 | Guilfoyle et al. |
| 5,018,130 A * | 5/1991 | Suzuki et al. ............ 398/51 |
| 5,170,273 A | 12/1992 | Nishio |
| 5,191,457 A | 3/1993 | Yamazaki |
| 5,194,977 A | 3/1993 | Nishio |
| 5,247,594 A | 9/1993 | Okuno et al. |
| 5,276,867 A * | 1/1994 | Kenley et al. ............ 707/204 |
| 5,319,484 A | 6/1994 | Jacob et al. |
| 5,325,222 A | 6/1994 | Jacob et al. |
| 5,414,548 A | 5/1995 | Tachikawa et al. |
| 5,416,625 A | 5/1995 | Cavaciuti et al. |
| 5,452,115 A | 9/1995 | Tomioka |
| 5,457,687 A | 10/1995 | Newman |
| 5,557,439 A | 9/1996 | Alexander et al. |
| 5,680,490 A | 10/1997 | Cohen et al. |
| 5,712,932 A | 1/1998 | Alexander et al. |

(Continued)

OTHER PUBLICATIONS

Mining the optical bandwidth for a terabit per second, Alan Eli Willner, IEEE Spectrum, Apr. 1997, pp. 32-41.

(Continued)

*Primary Examiner*—Sung H Pak
(74) *Attorney, Agent, or Firm*—Dorsey & Whitney LLP

(57) ABSTRACT

Devices and methods for optical processing and storage are described. In a preferred embodiment, an integrated optical gate matrix, that includes a set of nonlinear elements and waveguides interconnecting at least some nonlinear elements in the set of nonlinear elements, may be configured to enable optical processing. A first subset of the set of nonlinear elements is preferably configured to function as a set of ON/OFF switches in the "OFF" state to enable a second subset of the set of nonlinear elements to be configured in at least one optical processing configuration. Configuration of the second subset of the set of nonlinear elements may be used for various optical processing operations, such as all-optical 2R or 3R regeneration, wavelength conversion, data format conversion, demultiplexing, clock recovery, logic operations and dispersion compensation. Related apparatus and methods are also described.

9 Claims, 8 Drawing Sheets

U.S. PATENT DOCUMENTS

| | | | |
|---|---|---|---|
| 5,724,167 | A | 3/1998 | Sabella |
| 5,737,102 | A | 4/1998 | Asher |
| 5,739,935 | A | 4/1998 | Sabella |
| 5,774,244 | A | 6/1998 | Tandon et al. |
| 5,867,289 | A | 2/1999 | Gerstel et al. |
| 5,953,138 | A | 9/1999 | Ellis |
| 5,999,283 | A | 12/1999 | Roberts et al. |
| 6,023,360 | A | 2/2000 | Morioka et al. |
| 6,108,112 | A | 8/2000 | Touma |
| 6,204,944 | B1 | 3/2001 | Uchiyama et al. |
| 6,233,082 | B1 | 5/2001 | Johnson |
| 6,288,808 | B1 | 9/2001 | Lee et al. |
| 6,314,115 | B1 | 11/2001 | Delfyett et al. |
| 6,330,379 | B1 | 12/2001 | Hendriksen |
| 6,374,087 | B1 | 4/2002 | Gressent et al. |
| 6,404,522 | B1 | 6/2002 | Handelman |
| 6,408,113 | B1 | 6/2002 | Wu et al. |
| 6,574,018 | B1 | 6/2003 | Handelman |
| 6,614,582 | B1 | 9/2003 | Mikkelsen et al. |
| 6,636,337 | B2 | 10/2003 | Johnson et al. |
| 6,763,191 | B1 | 7/2004 | Handelman |
| 6,804,047 | B2 | 10/2004 | Byun et al. |
| 2001/0055439 | A1* | 12/2001 | Song ........................... 385/15 |
| 2002/0048067 | A1 | 4/2002 | Handelman et al. |
| 2002/0118441 | A1 | 8/2002 | Kang et al. |
| 2003/0043430 | A1 | 3/2003 | Handelman |
| 2003/0048506 | A1 | 3/2003 | Handelman |
| 2004/0208418 | A1 | 10/2004 | Handelman |
| 2007/0183712 | A1* | 8/2007 | Maeda ......................... 385/24 |

OTHER PUBLICATIONS

Record data-transmission rate reported at ECOC '96, Paul Mortensen, Laser Focus World, Nov. 1996, pp. 40-42.

Multiple wavelengths exploit fiber capacity, Eric J. Lerner, Laser Focus World, Jul. 1997, pp. 119-125.

Advances in dense WDM push diode-laser design, Diana Zankowsky, Laser Focus World, Aug. 1997, pp. 167-171.

Multistage amplifier provides gain across 80 nm, Kristin Lewotsky, Laser Focus World, Sep. 1997, pp. 22-24.

Optical switching promises cure for telecommunications logjam, Jeff Hecht, Laser Focus World, Sep. 1998, pp. 69-72.

Optical Switches Ease Bandwidth Crunch, EuroPhotonics, Rien Flipse, Aug./Sep. 1998, pp. 44-45.

Speed Demons: Is 'Faster' Better and Cheaper? Stephanie A. Weiss, Photonics Spectra, Feb. 1999, pp. 96-102.

Wavelength Lockers Keep Lasers in Line, Ed Miskovic, Photonics Spectra, Feb. 1999, pp. 104-110.

Optical switches pursue crossconnect markets, Hassaun Jones-Bey, Laser Focus World, May 1998, pp. 153-162.

Demand triggers advances in dense WDM components, Raymond Nering, Optoelectronics World, Sep. 1998, pp. S5-S8.

Optical Networks Seek Reconfigurable Add/Drop Options, Hector E. Escobar, Photonics Spectra, Dec. 1998, pp. 163-167.

Ultrafast Optical Switch Unveiled, Photonics Spectra, Michael D. Wheeler, Dec. 1998, p. 42.

Data express Gigabit junction with the next-generation Internet, John Collins et al, IEEE Spectrum, Feb. 1999, pp. 18-25.

Designing Broadband Fiber Optic Communication Systems, Juan F. Lam, Communication Systems Design, Feb. 1999.

Terabit/second-transmission demonstrations make a splash at OFC '96, Laser Focus World, Apr. 1996, p. 13.

Multigigabit Networks: The Challenge, Claude Rolland et al., IEEE LTS, May 1992, pp. 16-26.

Direct Detection Lightwave Systems: Why Pay More? Paul Green et al., IEEE LCS, Nov. 1990, pp. 36-49.

Photonics in Switching, H. Scott Hinton, IEEE LTS, Aug. 1992, pp. 26-35.

Advanced Technology for Fiber Optic Subscriber Systems, Hiromu Toba et al., IEEE LTS, Nov. 1992, pp. 12-18.

Fiber amplifiers expand network capacities, Eric J. Lerner, Laser Focus World, Aug. 1997, pp. 85-96.

Technologies for Local-Access Fibering, Yukou Mochida, IEEE Communications Magazine, Feb. 1994, pp. 64-73.

Wavelength Assignment in Multihop Lightwave Networks, Aura Ganz et al., IEEE Transactions on Communications, vol. 42, No. 7, Jul. 1994, pp. 2460-2469.

Wavelength-Division Switching Technology in Photonic Switching Systems, Suzuki et al., IEEE International Conference on Communications, ICC 1990, pp. 1125-1129.

Branch-Exchange Sequences for Reconfiguration of Lightwave Networks, Labourdette et al., IEEE Transactions on Communications, vol. 42, No. 10, Oct. 1994, pp. 2822-2832.

Use of Delegated Tuning and Forwarding in Wavelength Division Multiple Access Networks, Auerbach et al., IEEE Transactions on Communications, vol. 43, No. 1, Jan. 1995, pp. 52-63.

Combining gratings and filters reduces WDM channel spacing, Pan and Shi, Optoelectronics World, Sep. 1998, pp. S11-S17.

Optical amplifiers revolutionize communications, Gary T. Forrest, Laser Focus World, Sep. 1998, pp. 28-32.

Variable optical delay circuit using wavelength converters, T. Sakamoto et al, Electronics Letters, vol. 37, No. 7, Mar. 29, 2001, pp. 454-455.

Design and Cost Performance of the Multistage WDM-PON Access Networks, Guido Maier et al., Journal of Lightwave Technology, vol. 18, No. 2, Feb. 2000, pp. 125-143.

Polarization Insensitive Widely Tunable All-Optical Clock Recovery Based on AM Mode-Locking of a Fiber Ring Laser, Wang et al., IEEE Photonics Technology Letters, vol. 12, No. 2, Feb. 2000, pp. 211-213.

Ultra-High-Speed PLL-Type Clock Recovery Circuit Based on All-Optical Gain Modulation in Traveling-Wave Laser Diode Amplifier, Satoki Kawanishi et al., Journal of Lightwave Technology, vol. 11, No. 12, Dec. 1993, pp. 2123-2129.

All-optical networks need optical switches, Jeff Hecht, Laser Focus World, May 2000, pp. 189-196.

Photons At Work: Optical Networks On The Rise, Lee Goldberg, Electronic Design, Mar. 22, 1999, pp. 56-66.

Multiple Access Methods for Communications Networks, Izhak Rubin, The Communications Handbook, Jerry D. Gibson, 1997, CRC Press, Inc., pp. 622-649.

Asynchronous Time Division Switching, Achille Pattavina, The Communications Handbook, Jerry D. Gibson, 1997, CRC Press, Inc., pp. 686-700.

Picosecond-Accuracy All-Optical Bit Phase Sensing Using a Nonlinear Optical Loop Mirror, Hall et al., IEEE Photonics Technology Letters, vol. 7, No. 8, Aug. 1995, pp. 935-937.

An Ultrafast Variable Optical Delay Technique, Hall et al., IEEE Photonics Technology Letters, vol. 12, No. 2, Feb. 2000, pp. 208-210.

Prescaled 6.3GHz clock recovery from 50Gbit/s TDM optical signal with 50GHz PLL using four-wave mixing in a travelling-wave laser diode optical amplifier, Kamatani et al., Electronics Letters, May 12, 1994, vol. 30, No. 10, pp. 807-809.

Variable optical delay line with diffraction-limited autoalignment, Klovekorn and Munch, Applied Optics, Apr. 1, 1998, vol. 37, No. 10, pp. 1903-1904.

Compact 40 Gbit/s optical demultiplexer using a GaInAsP optical amplifier, Ellis et al., Electronics Letters, Nov. 25, 1993, vol. 29, No. 24, pp. 2115-2116.

Lucent Upgrades WaveStar to 320-Channel, 800-Gb/s Transmission; Chalmers Develops 49-dB Optical Parametric Amplifier, Photonics Spectra, Jun. 2000, p. 46.

Bit-Rate Flexible All-Optical Demultiplexing Using a Nonlinear Optical Loop Mirror, Patrick et al., Electronics Letters, Apr. 15, 1993, vol. 29, No. 8, pp. 702-703.

All-Optical High Speed Demultiplexing with a Semiconductor Laser Amplifier in a Loop Mirror Configuration, Eiselt et al., Electronics Letters, Jun. 24, 1993, vol. 29, No. 13, pp. 1167-1168.

Single interferometer demultiplexes 40-Gbit/s optical-time-division-multiplexed signal, Laser Focus World, Nov. 1999, p. 11.

Fiber-Optic Chips Multiplex 16 T1/E1 Channels Over One Cable, Denise Culhane, Electronic Design, Apr. 17, 2000, p. 46.

Analysis and Dimensioning of Switchless Networks for Single-Layer Optical Architecture, Binetti et al., Journal of Lightwave Technology, vol. 18,. No. 2, Feb. 2000, pp. 144-153.

100-Gbit/s bitwise logic, Hall et al., Optics Letters, vol. 23, No. 16, Aug. 15, 1998, pp. 1271-1273.

An Optical Technique for Bit and Packet Synchronization, Blixt and Bowers, IEEE Photonics Technology Letters, vol. 7, No. 1, Jan. 1995, pp. 123-125.

Double-Spreading Modulation Scheme Picks Up Where CDMA and TDMA Leave Off, Patrick Mannion, Electronic Design, Jul. 10, 2000, pp. 28-32.

Transmission of a True Single Polarisation 40 Gbit/s Soliton Data Signal Over 205km Using a Stabilised Erbium Fibre Ring Laser and 40GHz Electronic Timing Recovery, Ellis et al., Electronics Letters, vol. 29, No. 11, May 27, 1993, pp. 990-992.

Time-Stretch Methods Capture Fast Waveforms, Jalali et al., Microwaves & RF, Apr. 1999, pp. 62-69.

The Fiber-Optic Subscriber Network in Japan, Wakui, IEEE Communications Magazine, Feb. 1994, pp. 56-63.

Building Future Networks by Using Photonics in Switching, Stephen J. Hinterlong and David Vlack, The Communications Handbook, Jerry D. Gibson, 1997, CRC Press, Inc., pp. 513-528.

Synchronous Optical Network (SONET), Chris B. Autry and Henry L. Owen, The Communications Handbook, Jerry D. Gibson, 1997, CRC Press, Inc., pp. 542-553.

Synchronous Digital Hierarchy (SDH), Chris B. Autry and Henry L. Owen, The Communications Handbook, Jerry D. Gibson, 1997, CRC Press, Inc., pp. 554-564.

Architectural and Technological Issues for Future Optical Internet Networks, Listanti et al., IEEE Communications Magazine, Sep. 2000, pp. 82-92.

IP over Optical Networks: Architectural Aspects, Rajagopalan et al., IEEE Communications Magazine, Sep. 2000, pp. 94-102.

Labeled Optical Burst Switching for IP-over-WDM Integration, Chunming Qiao, IEEE Communications Magazine, Sep. 2000, pp. 104-114.

Approaches to Optical Internet Packet Switching, Hunter et al., IEEE Communications Magazine, Sep. 2000, pp. 116-122.

Photonic Switches: Fast, but Functional?, McCarthy, Photonics Spectra, Mar. 2001, pp. 140-150.

WDM Local Area Networks, Kazovsky et al., IEEE LTS, May 1992, pp. 8-15.

Fiber-based components meet the needs of next-generation amplifiers, Bourgeois, WDM Solutions, Mar. 2001, pp. 67-74.

Spectral equalization keeps optical signals in line, Ashmead, WDM Solutions, Jan. 2001, pp. 32-38.

Keep Your Photons in Line, Wesson et al., Photonics Spectra, Sep. 1999, pp. 102-108.

Router Promises Faster Switching, Robinson, Photonics Spectra, Aug. 2001, p. 24.

On a dynamic wavelength assignment algorithm for wavelength routed all-optical networks, Andrei G. Stoica, et al., Optical Networks Magazine, Jan./Feb. 2002, pp. 68-80.

XOR: A Logical Choice of All-Optical Networks, Perry J. Greenbaum, Photonics Spectra, Nov. 2001, pp. 30-31.

On adaptive routing in wavelength-routed networks, Ching-Fang Hsu, et al., Optical Networks Magazine, Jan./Feb. 2002, pp. 15-24.

A comparative study of distributed protocols for wavelength reservation in WDM optical networks, Debashis Saha, Optical Networks Magazine, Jan./Feb. 2002, pp. 45-52.

A framework for unified traffic engineering in IP over WDM networks, Jinhan Song, et al., Optical Networks Magazine, Nov./Dec. 2001, pp. 28-33.

Optimization of wavelength allocation in WDM optical buffers, Franco Callegati, et al., Optical Networks Magazine, Nov./Dec. 2001, pp. 66-72.

A Simple Dynamic Integrated Provisioning/Protection Scheme in IP over WDM Networks, Yinghua Ye, et al., IEEE Communications Magazine, Nov. 2001, pp. 174-182.

Photonic packet switching and optical label swapping, Daniel J. Blumenthal, Optical Networks Magazine, Nov./Dec. 2001, pp. 54-65.

Intelligent Optical Networking for Multilayer Suvivability, Sophie de Maesschalck, et al., IEEE Communications Magazine, Jan. 2002, pp. 42-49.

Crystal slows and stops light, John Wallace, Laser Focus World, Feb. 2002, vol. 38, No. 2, pp. 36-37.

Decision feedback loop compensates at 10 Gbit/s, Hassaun Jones-Bey, Laser Focus World, May 2000, pp. 65-67.

Alcatel Displays 1.6-Tb/s Transmission, Photonics Spectra, Dec. 2001, p. 18.

The Communications Handbook, Jerry D. Gibson, 1997, CRC Press, Inc., Chapter 61, pp. 832-847.

The Communications Handbook, Jerry D. Gibson, 1997, CRC Press, Inc., Chapter 65, pp. 883-890.

Optical Signal Processing for Optical Packet Switching Networks, Blumenthal et al, IEEE Optical Communications, Feb. 2003, pp. S23-S29.

100-km Negative-Dispersion Fiber Carries 10 Gb/s, Gaughan, Photonics Spectra, Nov. 2001, p. 42.

Managing Polarization Mode Dispersion, Chbat, Photonics Spectra, Jun. 2000, pp. 100-104.

Dynamic Dispersion Compensation: When and Where Will It Be Needed? Huff et al., Photonics Spectra, Dec. 2001, pp. 122-125.

Dispersion management is vital for high-speed systems, Jeff Hecht, Laser Focus World, Jul. 2001, pp. 79-83.

Tunable compensators master chromatic-dispersion impairments, Alan Willner, WDM Solutions, Jul. 2001, pp. 51-58.

Dispersion Compensation Gratings for the C-Band, Brennan, Photonics Spectra, Jun. 2001, pp. 159-165.

Hot rubidium slows light speed to 90 m/s, Kash, Laser Focus World, Aug. 1999, p. 11.

Network demonstrates 1500-km unregenerated transmission at 40 Gbit/s, Hamre, Laser Focus World, Jul. 2001, p. 11.

Electroholographic switches are fast and compact, Agranat, Laser Focus World, May 2001, pp. 109-111.

Switch based on SOA achieves femtosecond switching, Nakamura, Laser Focus World, Sep. 2001, p. 9.

Next-generation networks may benefit from SOAs, Young, Laser Focus World, Sep. 2001, pp. 73-79.

All-optical converters promise improved networks, Jeff Hecht, Laser Focus World, Apr. 2001, pp. 159-164.

Novel VOAs provide more speed and utility, Stephen Cohen, Laser Focus World, Nov. 2000, pp. 139-146.

Array-based VOAs offer compact signal control, Nigel Cockroft, WDM Solutions, Jun. 2001, pp. 81-85.

Semiconductor Optical Amplifier-Based All-Optical Gates for High-Speed Optical Processing, Kristian E. Stubkjaer, IEEE Journal on Selected Topics in Quantum Electronics, vol. 6, No. 6, Nov./Dec. 2000, pp. 1428-1435.

All-optical switching for high bandwidth optical networks, M. J. Potasek, Optical Networks Magazine, Nov./Dec. 2002, pp. 30-43.

80Gbit/s all-optical regenerative wavelength conversion using semiconductor optical amplifier based interferometer, Kelly et al, Electronics Letters, vol. 35, No. 17, Aug. 19, 1999, pp. 1477-1478.

Demultiplexing of 168-Gb/s Data Pulses with a Hybrid-Integrated Symmetric Mach-Zehnder All-Optical Switch, Nakamura et al, IEEE Photonics Technology Letters, vol. 12, No. 4, Apr. 2000, pp. 425-427.

All-Optical 2R Regeneration Based on Polarization Rotation in a Linear Optical Amplifier, Zhao et al, IEEE Photonics Technology Letters, vol. 15, No. 2, Feb. 2003, pp. 305-307.

All-Optical Data Format Conversion Between RZ and NRZ Based on a Mach-Zehnder Interferometric Wavelength Converter, Xu et al, IEEE Photonics Technology Letters, vol. 15, No. 2, Feb. 2003, pp. 308-310.

All-optical wavelength converter scheme for high speed RZ signal formats, Mikkelsen et al, Electronics Letters, vol. 33, No. 25, Dec. 4, 1997, pp. 2137-2139.

Penalty-Free Error-Free All-Optical Data Pulse Regeneration at 84 Gb/s by Using a Symmetric-Mach-Zehnder-Type Semiconductor Regenerator, Ueno et al, IEEE Photonics Technology Letters, vol. 13, No. 5, May 2001, pp. 469-471.

40-Gb/s All-Optical Wavelength Conversion, Regeneration, and Demultiplexing in an SOA-Based All-Active Mach-Zehnder Interferometer, Wolfson et al, IEEE Photonics Technology Letters, vol. 12, No. 3, Mar. 2000, pp. 332-334.

Compensation fibre chromatic dispersion by optical phase conjugation in a semiconductor laser amplifier, Tatham et al, Electronics Letters, vol. 29, No. 21, Oct. 14, 1993, pp. 1851-1852.

All-Optical 2R Regeneration of 40-Gb/s Signal Impaired by Intrachannel Four-Wave Mixing, Su et al, IEEE Photonics Technology Letters, vol. 15, No. 2, Feb. 2003, pp. 350-352.

1-Tb/s 16-b All-Optical Serial-to-Parallel Conversion Using a Surface-Reflection Optical Switch, Takahashi et al, IEEE Photonics Technology Letters, vol. 15, No. 2, Feb. 2003, pp. 287-289.

Wavelength Switching Components for Future Photonic Networks, White et al., IEEE Communications Magazine, Sep. 2002, pp. 74-81.

Ultrafast (200-fs Switching, 1.5-Tb/s Demultiplexing) and High-Repetition (10GHz) Operations of a Polarization-Discriminating Symmetric Mach-Zehnder All-Optical Switch, Nakamura et al, IEEE Photonics Technology Letters, vol. 10, No. 11, Nov. 1998, pp. 1575-1577.

Ultrafast high-contrast all-optical switching using spin polarization in low-temperature-grown multiple quantum wells, Takahashi et al, Applied Physics Letters, vol. 77, No. 19, Nov. 6, 2000, pp. 2958-2960.

Compensation for channel dispersion by nonlinear optical phase conjugation, Yariv et al, Optics Letters, vol. 4, No. 2, Feb. 1979, pp. 52-54.

Architecture of Ultrafast Optical Packet Switching Ring Network, Takada et al, Journal of Lightwave Technology, vol. 20, No. 12, Dec. 2002, pp. 2306-2315.

Monolithically Integrated 2×2 InGaAsP/InP Laser Amplifier Gate Switch Arrays, Janson et al, Electronics Letters, vol. 28, No. 8, Apr. 9, 1992, pp. 776-778.

Monolithically Integrated 4×4 InGaAsP/InP Laser Amplifier Gate Switch Arrays, Gustavsson et al, Electronics Letters, vol. 28, No. 24, Nov. 19, 1992, pp. 2223-2225.

All-Optical Triode Based on a Tandem Wavelength Converter Using Reflective Semiconductor Optical Amplifiers, Maeda et al, IEEE Photonics Technology Letters, vol. 15, No. 2, Feb. 2003, pp. 257-259.

160-Gb/s Optical-Time-Division Multiplexing With PPLN Hybrid Integrated Planar Lightwave Circuit, Ohara et al, IEEE Photonics Technology Letters, vol. 15, No. 2, Feb. 2003, pp. 302-304.

Low-temperature-grown surface-reflection all-optical switch (LOTOS), Ryo Takahashi, Optical and Quantum Electronics, vol. 33, 2001, pp. 999-1017.

Ultrafast 168 GHz 1.5 ps 1 fJ Symmetric-Mach-Zehnder-Type All-Optical Semiconductor Switch, Ueno et al, Japan Journal of Applied Physics, vol. 39 (2000) pp. L806-L808, Part 2, No. 8A, Aug. 1, 2000.

Semiconductor Arrayed Waveguide Gratings for Photonic Integrated Devices, Yuzo Yoshikuni, IEEE Journal of Selected Topics in Quantum Electronics, vol. 8, No. 6, Nov./Dec. 2002, pp. 1102-1114.

*N×N* Arrayed Waveguide Gratings With Improved Frequency Accuracy, Bernasconi et al, IEEE Journal of Selected Topics in Quantum Electronics, vol. 8, No. 6, Nov./Dec. 2002, pp. 1115-1121.

The New Indelible Memories, Linda Geppert, IEEE Spectrum, Mar. 2003, pp. 49-54.

Integration of waveguide devices aims to reduce costs, Jeff Hecht, Laser Focus World, Sep. 2002, pp. 113-117.

Band architecture improves performance, Marshall et al, Laser Focus World, Sep. 2002, pp. S7-S10.

Optical information processing awaits optoelectronic devices, Francis Yu, Laser Focus World, Sep. 2002, pp. 71-74.

Monolithic Integration of a Semiconductor Optical Amplifier and a High Bandwidth p-i-n Photodiode Using Asymmetric Twin-Waveguide Technology, Xia et al, IEEE Photonics Technology Letters, vol. 15, No. 3, Mar. 2003, pp. 452-454.

Optical crossconnect architectures for wavelength-routed WDM networks, Xiangdong Qin and Yuanyuan Yang, Optical Networks Magazine, Jul./Aug. 2003, pp. 50-63.

* cited by examiner

FIG. 11

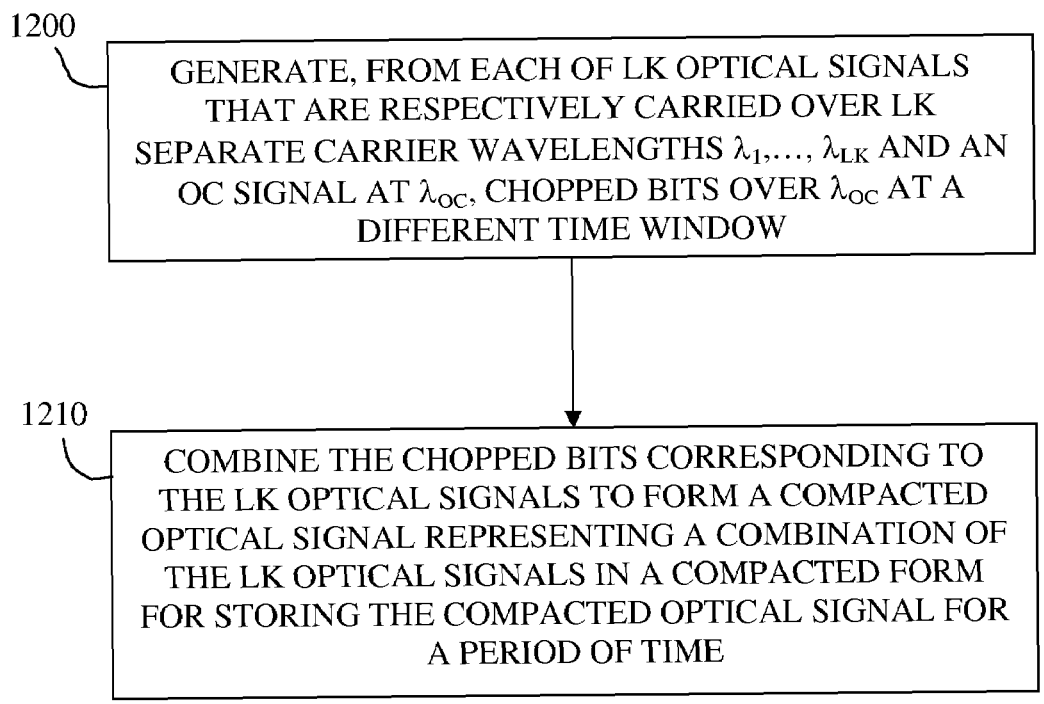

1200 — GENERATE, FROM EACH OF LK OPTICAL SIGNALS THAT ARE RESPECTIVELY CARRIED OVER LK SEPARATE CARRIER WAVELENGTHS $\lambda_1, \ldots, \lambda_{LK}$ AND AN OC SIGNAL AT $\lambda_{OC}$, CHOPPED BITS OVER $\lambda_{OC}$ AT A DIFFERENT TIME WINDOW 1210 — COMBINE THE CHOPPED BITS CORRESPONDING TO THE LK OPTICAL SIGNALS TO FORM A COMPACTED OPTICAL SIGNAL REPRESENTING A COMBINATION OF THE LK OPTICAL SIGNALS IN A COMPACTED FORM FOR STORING THE COMPACTED OPTICAL SIGNAL FOR A PERIOD OF TIME

DEVICES AND METHODS FOR ALL-OPTICAL PROCESSING AND STORAGE

CROSS-REFERENCE TO RELATED APPLICATIONS

The present application is a division of U.S. patent application Ser. No. 10/619,413, filed Jul. 16, 2003.

FIELD OF THE INVENTION

The present invention generally relates to optical processing and storage and applications thereof.

BACKGROUND OF THE INVENTION

As optical communication evolves, a greater need is experienced for optical processing devices with all-optical processing functionality and all-optical storage capabilities for various optical communication applications such as optical switching. Although elements that enable simple optical processing operations such as wavelength conversion and demultiplexing exist today, further developments are required, for example, to enable programmability of all-optical processing operations and performance of integrated operations.

Elements for all-optical processing are described in the following publications:

an article entitled "Semiconductor Optical Amplifier-Based All-Optical Gates for High-Speed Optical Processing", by Kristian E. Stubkjaer in *IEEE Journal on Selected Topics in Quantum Electronics*, Vol. 6, No. 6, November/December 2000, pages 1428-1435;

an article entitled "80 Gbit/s all-optical regenerative wavelength conversion using semiconductor optical amplifier based interferometer", by Kelly et al in *Electronics Letters*, Vol. 35, No. 17, 19 Aug. 1999, pages 1477-1478;

an article entitled "Demultiplexing of 168-Gb/s Data Pulses with a Hybrid-Integrated Symmetric Mach-Zehnder All-Optical Switch", by Nakamura et al in *IEEE Photonics Technology Letters*, Vol. 12, No. 4, April 2000, pages 425-427;

an article entitled "All-Optical 2R Regeneration Based on Polarization Rotation in a Linear Optical Amplifier", by Zhao et al in *IEEE Photonics Technology Letters*, Vol. 15, No. 2, February 2003, pages 305-307;

an article entitled "All-Optical Data Format Conversion Between RZ and NRZ Based on a Mach-Zehnder Interferometric Wavelength Converter", by Xu et al in *IEEE Photonics Technology Letters*, Vol. 15, No. 2, February 2003, pages 308-310;

an article entitled "All-optical wavelength converter scheme for high speed RZ signal formats", by Mikkelsen et al in *Electronics Letters*, Vol. 33, No. 25, 4 Dec. 1997, pages 2137-2139;

an article entitled "Penalty-Free Error-Free All-Optical Data Pulse Regeneration at 84 Gb/s by Using a Symmetric-Mach-Zehnder-Type Semiconductor Regenerator", by Ueno et al in *IEEE Photonics Technology Letters*, Vol. 13, No. 5, May 2001, pages 469-471;

an article entitled "All-optical switching for high bandwidth optical networks", by M. J. Potasek in *Optical Networks Magazine*, November/December 2002, pages 30-43;

an article entitled "40-Gb/s All-Optical Wavelength Conversion, Regeneration, and Demultiplexing in an SOA-Based All-Active Mach-Zehnder Interferometer", by Wolfson et al in *IEEE Photonics Technology Letters*, Vol. 12, No. 3, March 2000, pages 332-334;

an article entitled "Compensation fibre chromatic dispersion by optical phase conjugation in a semiconductor laser amplifier", by Tatham et al in *Electronics Letters*, Vol. 29, No. 21, 14 Oct. 1993, pages 1851-1852;

an article entitled "All-Optical 2R Regeneration of 40-Gb/s Signal Impaired by Intrachannel Four-Wave Mixing", by Su et al in *IEEE Photonics Technology Letters*, Vol. 15, No. 2, February 2003, pages 350-352;

an article entitled "1-Tb/s 16-b All-Optical Serial-to-Parallel Conversion Using a Surface-Reflection Optical Switch", by Takahashi et al in *IEEE Photonics Technology Letters*, Vol. 15, No. 2, February 2003, pages 287-289; and an article entitled "Wavelength Switching Components for Future Photonic Networks", by White et al in *IEEE Communications Magazine*, September 2002, pages 74-81.

All-optical storage is described in U.S. patent application Ser. No. 10/152,289 of Handelman, now published as Pub. No. US 2004/0208418, and entitled "Apparatus and Method for Delaying Optical Signals for Optical Buffering and Optical Storage Applications". All-optical storage is also described in an article entitled "Variable optical delay circuit using wavelength converters", by Sakamoto et al in *Electronics Letters*, Vol. 37, No. 7, 29 Mar. 2001, pages 454-455.

Some aspects of technologies and related art that may be useful in understanding the present invention are described in the following publications:

an article entitled "Ultrafast (200-fs Switching, 1.5-Tb/s Demultiplexing) and High-Repetition (10 GHz) Operations of a Polarization-Discriminating Symmetric Mach-Zehnder All-Optical Switch", by Nakamura et al in *IEEE Photonics Technology Letters*, Vol. 10, No. 11, November 1998, pages 1575-1577;

an article entitled "Ultrafast high-contrast all-optical switching using spin polarization in low-temperature-grown multiple quantum wells", by Takahashi et al in *Applied Physics Letters*, Vol. 77, No. 19, 6 Nov. 2000, pages 2958-2960;

an article entitled "Compensation for channel dispersion by nonlinear optical phase conjugation", by Yariv et al in *Optics Letters*, Vol. 4, No. 2, February 1979, pages 52-54;

an article entitled "Architecture of Ultrafast Optical Packet Switching Ring Network", by Takada et al in *Journal of Lightwave Technology*, Vol. 20, No. 12, December 2002, pages 2306-2315;

an article entitled "Monolithically Integrated 2×2 InGaAsP/InP Laser Amplifier Gate Switch Arrays", by Janson et al in *Electronics Letters*, Vol. 28, No. 8, 9 Apr. 1992, pages 776-778;

an article entitled "Monolithically Integrated 4×4 InGaAsP/InP Laser Amplifier Gate Switch Arrays", by Gustavsson et al in *Electronics Letters*, Vol. 28, No. 24, 19 Nov. 1992, pages 2223-2225;

an article entitled "All-Optical Triode Based on a Tandem Wavelength Converter Using Reflective Semiconductor Optical Amplifiers", by Maeda et al in *IEEE Photonics Technology Letters*, Vol. 15, No. 2, February 2003, pages 257-259;

an article entitled "160-Gb/s Optical-Time-Division Multiplexing With PPLN Hybrid Integrated Planar Lightwave Circuit", by Ohara et al in *IEEE Photonics Technology Letters*, Vol. 15, No. 2, February 2003, pages 302-304;

an article entitled "Low-temperature-grown surface-reflection all-optical switch (LOTOS)", by Ryo Takahashi in *Optical and Quantum Electronics*, Vol. 33, 2001, pages 999-1017;

an article entitled "Ultrafast 168 GHz 1.5 ps 1 fJ Symmetric-Mach-Zehnder-Type All-Optical Semiconductor Switch", by Ueno et al in *Japan Journal of Applied Physics*, Vol. 39 (2000) pages L806-L808, Part 2, No. 8A, 1 Aug. 2000;

an article entitled "Semiconductor Arrayed Waveguide Gratings for Photonic Integrated Devices", by Yuzo Yoshikuni in *IEEE Journal on Selected Topics in Quantum Electronics*, Vol. 8, No. 6, November/December 2002, pages 1102-1114;

an article entitled "N×N Arrayed Waveguide Gratings With Improved Frequency Accuracy", by Bernasconi et al in *IEEE Journal on Selected Topics in Quantum Electronics*, Vol. 8, No. 6, November/December 2002, pages 1115-1121;

an article entitled "The New Indelible Memories", by Linda Geppert in *IEEE Spectrum*, March 2003, pages 49-54;

an article entitled "Integration of waveguide devices aims to reduce costs", by Jeff Hecht in *Laser Focus World*, September 2002, pages 113-117;

an article entitled "Band architecture improves performance", by Marshall et al in *Laser Focus World*, September 2002, pages S7-S10;

an article entitled "Optical information processing awaits optoelectronic devices", by Francis Yu in *Laser Focus World*, September 2002, pages 71-74;

an article entitled "Monolithic Integration of a Semiconductor Optical Amplifier and a High Bandwidth p-i-n Photodiode Using Asymmetric Twin-Waveguide Technology", by Xia et al in *IEEE Photonics Technology Letters*, Vol. 15, No. 3, March 2003, pages 452-454;

an article entitled "Architectural and Technological Issues for Future Optical Internet Networks", by Listanti et al in *IEEE Communications Magazine*, September 2000, pages 82-92;

an article entitled "IP over Optical Networks: Architectural Aspects", by Rajagopalan et al in *IEEE Communications Magazine*, September 2000, pages 94-102;

an article entitled "Labeled Optical Burst Switching for IP-over-WDM Integration", by Chunming Qiao in *IEEE Communications Magazine*, September 2000, pages 104-114;

an article entitled "Approaches to Optical Internet Packet Switching", by Hunter et al in *IEEE Communications Magazine*, September 2000, pages 116-122;

an article entitled "A framework for unified traffic engineering in IP over WDM networks", by Song et al in *Optical Networks Magazine*, November/December 2001, pages 28-33;

an article entitled "Optimization of wavelength allocation in WDM optical buffers", by Callegati et al in *Optical Networks Magazine*, November/December 2001, pages 66-72;

an article entitled "Mining the Optical Bandwidth for a Terabit per Second", by Alan Eli Willner in *IEEE Spectrum*, April 1997, pages 32-41;

an article entitled "Variable optical delay line with diffraction-limited autoalignment" by Klovekorn et al in *Applied Optics*, Vol. 37, No. 10, Apr. 1, 1998, pages 1903-1904;

an article entitled "Picosecond-Accuracy All-Optical Bit Phase Sensing Using a Nonlinear Optical Loop Mirror", by Hall et al in *IEEE Photonics Technology Letters*, Vol. 7, No. 8, August 1995, pages 935-937;

an article entitled "An Ultrafast Variable Optical Delay Technique", by Hall et al in *IEEE Photonics Technology Letters*, Vol. 12, No. 2, February 2000, pages 208-210;

an article entitled "Design and Cost Performance of the Multistage WDM-PON Access Networks", by Maier et al in *Journal of Lightwave Technology*, Vol. 18, No. 2, February 2000, pages 125-143;

an article entitled "Multistage Amplifier Provides Gain Across 80 nm", by Kristin Lewotsky in *Laser Focus World*, September 1997, pages 22-24;

a conference review entitled "Optical amplifiers revolutionize communications", by Gary T. Forrest in *Laser Focus World*, September 1998, pages 28-32;

an article entitled "Optical Networks Seek Reconfigurable Add/Drop Options", by Hector E. Escobar in *Photonics Spectra*, December 1998, pages 163-167;

an article entitled "Multiple Wavelengths Exploit Fiber Capacity", by Eric J. Lerner in *Laser Focus World*, July 1997, pages 119-125;

an article entitled "Advances in Dense WDM Push Diode-Laser Design", by Diana Zankowsky in *Laser Focus World*, August 1997, pages 167-171;

an article entitled "Optical switching promises cure for telecommunications logjam", by Jeff Hecht in *Laser Focus World*, September 1998, pages 69-72;

an article entitled "Speed Demons: Is 'Faster' Better and Cheaper?", by Stephanie A. Weiss in *Photonics Spectra*, February 1999, pages 96-102;

an article entitled "Wavelength Lockers Keep Lasers in Line", by Ed Miskovic in *Photonics Spectra*, February 1999, pages 104-110;

an article entitled "Multigigabit Networks: The Challenge", by Rolland et al in *IEEE LTS*, May 1992, pages 16-26;

an article entitled "Direct Detection Lightwave Systems: Why Pay More?", by Green et al in *IEEE LCS*, November 1990, pages 36-49;

an article entitled "Photonics in Switching", by H. Scott Hinton in *IEEE LTS*, August 1992, pages 26-35;

an article entitled "Fiber amplifiers expand network capacities", by Eric J. Lerner in *Laser Focus World*, August 1997, pages 85-96;

an article entitled "Technologies for Local-Access Fibering", by Yukou Mochida in *IEEE Communications Magazine*, February 1994, pages 64-73;

an article entitled "Wavelength-Division Switching Technology in Photonic Switching Systems", by Suzuki et al in IEEE International Conference on Communications ICC '90, pages 1125-1129;

an article entitled "Wavelength Assignment in Multihop Lightwave Networks", by Ganz et al in *IEEE Transactions on Communications*, Vol. 42, No. 7, July 1994, pages 2460-2469;

an article entitled "Branch-Exchange Sequences for Reconfiguration of Lightwave Networks", by Labourdette et al in *IEEE Transactions on Communications*, Vol. 42, No. 10, October 1994, pages 2822-2832;

an article entitled "Use of Delegated Tuning and Forwarding in Wavelength Division Multiple Access Networks", by Auerbach et al in *IEEE Transactions on Communications*, Vol. 43, No. 1, January 1995, pages 52-63;

an article entitled "Photonic Switches: Fast, but Functional?", by Daniel C. McCarthy in *Photonics Spectra*, March 2001, pages 140-150;

an article entitled "Combining gratings and filters reduces WDM channel spacing", by Pan et al in *Optoelectronics World*, September 1998, pages S11-S17;

an article entitled "100-Gbit/s bitwise logic", by Hall et al in *Optics Letters*, Vol. 23, No. 16, Aug. 15, 1998, pages 1271-1273;

an article entitled "Analysis and Dimensioning of Switchless Networks for Single-Layer Optical Architecture", by Binetti et al in *Journal of Lightwave Technology*, Vol. 18, No. 2, February 2000, pages 144-153;

an article entitled "Fiber-based components meet the needs of next-generation amplifiers", by Stephane Bourgeois in *WDM Solutions*, March 2001, pages 67-74;

an article entitled "Keep Your Photons in Line", by Wesson et al in *Photonics Spectra*, September 1999, pages 102-108;

an article entitled "Photons At Work: Optical Networks On The Rise", by Lee Goldberg in *Electronic Design*, Mar. 22, 1999, pages 56-66;

an article entitled "Photonic packet switching and optical label swapping", by Daniel J. Blumenthal in *Optical Networks Magazine*, November/December 2001, pages 54-65;

an article entitled "On a dynamic wavelength assignment algorithm for wavelength routed all-optical networks", by Stoica et al in *Optical Networks Magazine*, January/February 2002, pages 68-80;

an article entitled "Crystal slows and stops light", by John Wallace in *Laser Focus World*, February 2002, Vol. 38, No. 2, pages 36-37;

an article entitled "Decision feedback loop compensates at 10 Gbit/s", by Hassaun Jones-Bey in *Laser Focus World*, May 2000, pages 65-67;

an article entitled "100-km Negative-Dispersion Fiber carries 10 Gb/s", by Richard Gaughan in *Photonics Spectra*, November 2001, page 42;

an article entitled "Managing Polarization Mode Dispersion", by Michel W. Chbat in *Photonics Spectra*, June 2000, pages 100-104;

an item entitled "Alcatel Displays 1.6-Tb/s Transmission" in the Presstime Bulletin section in *Photonics Spectra*, December 2001, page 18;

an article entitled "Dynamic Dispersion Compensation: When and Where Will It Be Needed?", by Lisa Huff and Christine Mulrooney in *Photonics Spectra*, December 2001, pages 122-125;

an article entitled "Dispersion management is vital for high-speed systems", by Jeff Hecht in *Laser Focus World*, July 2001, pages 79-87;

an article entitled "Tunable compensators master chromatic-dispersion impairments", by Alan Willner in *WDM Solutions*, July 2001, pages 51-58;

an article entitled "Dispersion Compensation Gratings for the C-Band", by James F. Brennan III in *Photonics Spectra*, June 2001, pages 159-165;

a newsbreak item entitled "Hot rubidium slows light speed to 90 m/s", in *Laser Focus World*, August 1999, page 11;

a newsbreak item entitled "Network demonstrates 1500-km unregenerated transmission at 40 Gbits/s", in *Laser Focus World*, July 2001, page 11;

an article entitled "Electroholographic switches are fast and compact", by Aharon J. Agranat in *Laser Focus World*, May 2001, pages 109-112;

a newsbreak item entitled "Switch based on SOA achieves femtosecond switching", in *Laser Focus World*, September 2001, page 9;

an article entitled "Next-generation networks may benefit from SOAs", by Martin Young in *Laser Focus World*, September 2001, pages 73-79;

an article entitled "All-optical converters promise improved networks", by Jeff Hecht in *Laser Focus World*, April 2001, pages 159-164;

an article entitled "Novel VOAs provide more speed and utility", by Stephen Cohen in *Laser Focus World*, November 2000, pages 139-146;

an article entitled "Array-based VOAs offer compact signal control", by Nigel Cockroft in *WDM Solutions*, June 2001, pages 81-86;

an article entitled "Polarization Insensitive Widely Tunable All-Optical Clock Recovery Based on AM Mode-Locking of a Fiber Ring Laser", by Wang et al in *IEEE Photonics Technology Letters*, Vol. 12, No. 2, February 2000, pages 211-213;

an article entitled "Ultra-High-Speed PLL-Type Clock Recovery Circuit Based on All-Optical Gain Modulation in Traveling-Wave Laser Diode Amplifier", by Kawanishi et al in *Journal of Lightwave Technology*, Vol. 11, No. 12, December 1993, pages 2123-2129;

an article entitled "Prescaled 6.3 GHz clock recovery from 50 GBit/s TDM optical signal with 50 GHz PLL using four-wave mixing in a traveling-wave laser diode optical amplifier", by Kamatani et al in *Electronics Letters*, Vol. 30, No. 10, May 12, 1994, pages 807-809;

an article entitled "Compact 40 Gbit/s optical demultiplexer using a GaInAsP optical amplifier", by Ellis et al in *Electronics Letters*, Vol. 29, No. 24, Nov. 25, 1993, pages 2115-2116;

an article entitled "Bit-Rate Flexible All-Optical Demultiplexing Using a Nonlinear Optical Loop Mirror", by Patrick et al in *Electronics Letters*, Vol. 29, No. 8, Apr. 15, 1993, pages 702-703;

an article entitled "All-Optical High Speed Demultiplexing with a Semiconductor Laser Amplifier in a loop Mirror Configuration", by Eiselt et al in *Electronics Letters*, Vol. 29, No. 13, Jun. 24, 1993, pages 1167-1168;

a technology brief entitled "Lucent Upgrades Wavestar to 320-Channel, 800-Gb/s Transmission", in *Photonics Spectra*, June 2000, page 46;

an article entitled "All-optical networks need optical switches", by Jeff Hecht in *Laser Focus World*, May 2000, pages 189-196;

an article entitled "Record data-transmission rate reported at ECOC '96", by Paul Mortensen in *Laser Focus World*, November 1996, pages 40-42;

an article entitled "WDM Local Area Networks", by Kazovsky et al in *IEEE LTS*, May 1992, pages 8-15;

an article entitled "Optical Switches Ease Bandwidth Crunch", by Rien Flipse in *EuroPhotonics*, August/September 1998, pages 44-45;

an article entitled "Optical switches pursue crossconnect markets", by Hassaun Jones-Bay in *Laser Focus World*, May 1998, pages 153-162;

an article entitled "Data express Gigabit junction with the next-generation Internet", by Collins et al in *IEEE Spectrum*, February 1999, pages 18-25;

an article entitled "Advanced Technology for Fiber Optic Subscriber Systems", by Toba et al in *IEEE LTS*, November 1992, pages 12-18;

an article entitled "Demand triggers advances in dense WDM components", by Raymond Nering in *Optoelectronics World*, September 1998, pages S5-S8;

an article entitled "Ultrafast Optical Switch Unveiled", by Michael D. Wheeler in *Photonics Spectra*, December 1998, page 42;

an article entitled "Designing Broadband Fiber Optic Communication Systems", by Juan F. Lam in *Communication Systems Design* magazine, February 1999, pages 1-4 at http://www.csdmag.com;

an article entitled "Terabit/second-transmission demonstrations make a splash at OFC '96", in *Laser Focus World*, April 1996, page 13;

an article entitled "A Simple Dynamic Integrated Provisioning/Protection Scheme in IP Over WDM Networks", by Ye et al in *IEEE Communications Magazine*, November 2001, pages 174-182;

an article entitled "XOR: A Logical Choice for All-Optical Networks", by Perry J. Greenbaum in *Photonics Spectra*, November 2001, pages 30-31; and The following chapters in *The Communications Handbook*, CRC Press & IEEE Press, 1997, Editor-in-Chief Jerry D. Gibson: Chapter 37 on pages 513-528; Chapter 39 on pages 542-553; Chapter 40 on pages 554-564; Chapter 46 on pages 622-649; Chapter 51 on pages 686-700; Chapter 61 on pages 832-847; and Chapter 65 on pages 883-890.

Additional aspects of technologies that may be useful in understanding the present invention are described in the following patent applications and patents:

U.S. patent application Ser. No. 09/624,983 of Handelman, now U.S. Pat. No. 6,763,191, that describes an optical switching apparatus that selectively combines and separates series of optical signal samples using OTDM and/or WDM;

Published US Patent application Pub. No. US 2002/0048067 A1 of Handelman et al that describes an optical switching apparatus that selectively combines and separates, using OTDM and/or WDM, optical signal samples that are obtained by a spread spectrum technique or a combination of optical signal samples that are obtained by a spread spectrum technique and optical signal samples that are carried over discrete channel wavelengths;

Published US patent application Pub. No. US 2003/0048506 A1 of Handelman that describes an optical packet switch that switches optical packets according to bit-rates at which the optical packets are provided;

Published US patent application Pub. No. US 2003/0043430 A1 of Handelman that describes an optical packet switch in which NW wavelengths, over which inputted optical packets may be switched, are grouped into KG groups of wavelengths, where the KG groups of wavelengths are characterized in that each of the KG groups of wavelengths is allocated to optical packets distinguished from other optical packets by at least one attribute of at least one packet characteristic, and each one inputted optical packet is switched over a wavelength having an available transmission resource selected from among wavelengths in one of the KG groups of wavelengths that is matched to the one inputted optical packet by correspondence of attributes of the at least one packet characteristic; and The following patents: U.S. Pat. Nos. 4,626,075; 4,726,010; 5,170,273; 5,191,457; 5,194,977; 5,319,484; 5,325,222; 5,416,625; 5,452,115; 5,457,687; 5,557,439; 5,680,490; 5,712,932; 5,724,167; 5,739,935; 5,774,244; 5,867,289; 5,953,138; 6,023,360; 6,108,112; 6,204,944; 6,233,082; 6,288,808; 6,314,115; 6,404,522; and 6,574,018.

The disclosures of all references mentioned above and throughout the present specification are hereby incorporated herein by reference.

SUMMARY OF THE INVENTION

The present invention seeks to provide devices and methods for all-optical processing and all-optical storage with improved functionality and capabilities, particularly, but not only, in terms of configurability, programmability of all-optical processing operations, performance of integrated operations, dense all-optical storage, and usage of all-optical storage.

Further objects and features of the present invention will become apparent to those skilled in the art from the following description and the accompanying drawings.

There is thus provided in accordance with a preferred embodiment of the present invention a configurable integrated optical gate matrix including a set of nonlinear elements in which a first subset of the set of nonlinear elements is configured to function as a set of ON/OFF switches in the "OFF" state to enable a second subset of the set of nonlinear elements to be configured in at least one optical processing configuration, and a plurality of waveguides interconnecting at least some nonlinear elements in the set of nonlinear elements.

Preferably, the set of nonlinear elements is arranged essentially in a parallelogram matrix or a plurality of parallelogram matrices.

The set of nonlinear elements preferably includes nonlinear elements based on at least one of the following: semiconductor optical amplifiers (SOAs), waveguide devices, and electro-optic nonlinear materials.

Preferably, the at least one optical processing configuration includes at least one of the following configurations: a configuration for all-optical 2R regeneration, a configuration for all-optical 3R regeneration, a configuration for wavelength conversion, a configuration for data format conversion, a configuration for demultiplexing, a configuration for clock recovery, a configuration for a logic operation, and a configuration for dispersion compensation.

The at least one optical processing configuration is preferably implemented by at least one of the following configurations: at least one interferometric configuration, at least one configuration that enables cross gain modulation (XGM), at least one configuration that enables four-wave mixing (FWM), and a combination of at least two of the following: at least one interferometric configuration, at least one configuration that enables XGM, and at least one configuration that enables FWM. The at least one interferometric configuration preferably includes at least one of the following: a Mach Zehnder interferometric (MZI) configuration, a Michelson interferometric (MI) configuration, and a delayed interference configuration.

The second subset of the set of nonlinear elements may preferably include nonlinear element configurations outputting at least some optical signals in essentially opposite directions.

The optical gate matrix additionally includes a controller and driver interface operatively associated with the set of nonlinear elements and operative to provide an interface to a controller and driver for enabling programmable selection by the controller and driver of at least one of the following: a number of nonlinear elements in the first subset, a number of nonlinear elements in the second subset, a distribution of the nonlinear elements in the first subset, and a distribution of the nonlinear elements in the second subset.

Still additionally, the optical gate matrix also includes input/output (I/O) ports operative to direct light into and/or out of at least some nonlinear elements in the set of nonlinear elements. Further additionally, the optical gate matrix also includes optical filters operative to direct light at selective wavelengths into and/or out of at least some nonlinear elements in the set of nonlinear elements.

The configurable integrated optical gate matrix may preferably be comprised in an optical processing unit (OPU).

There is also provided in accordance with a preferred embodiment of the present invention a photonic device for selectively performing on an input optical signal an optical processing operation and a switching operation, the photonic device including a first nonlinear element, and a set of nonlinear elements including a second nonlinear element and not including the first nonlinear element, the set of nonlinear elements being configured in an optical processing configuration, wherein the photonic device is controlled to enable performance of the optical processing operation on the input optical signal by the set of nonlinear elements to output an optical processing result to a first output route when the second nonlinear element is turned to an "ON" state and the first nonlinear element is turned to an "OFF" state, and to switch the input optical signal to a second output route by turning the first nonlinear element to an "ON" state when the second nonlinear element is turned to an "OFF" state.

The optical processing operation preferably includes at least one of the following: all-optical 2R regeneration, all-optical 3R regeneration, wavelength conversion, data format conversion, demultiplexing, clock recovery, a logic operation, and dispersion compensation.

Preferably, each of the first nonlinear element, the second nonlinear element and the set of nonlinear elements includes a nonlinear element based on at least one of the following: SOAs, waveguide devices, and electro-optic nonlinear materials.

Further in accordance with a preferred embodiment of the present invention there is provided a memory unit for storing optical information, the memory unit including a controller operative to determine whether the optical information is to be stored for a time period exceeding a threshold or for a time period not exceeding the threshold, an all-optical flash memory device operatively associated with the controller and operative to perform all-optical flash storage of the optical information for the time period not exceeding the threshold, and an information storage element operatively associated with the all-optical flash memory device and the controller and operative, if the optical information is to be stored for the time period exceeding the threshold, to receive the optical information from the all-optical flash memory device, and to store a representation of the optical information in a form suitable for storage in the information storage element for an additional time period to reach the time period exceeding the threshold.

The information storage element preferably includes at least one of the following storage media: a magnetic memory media, an electronic memory media, a magneto-optic memory media, a ferroelectric memory media, a magnetoresistive memory media, an Ovonic Unified Memory (OUM) media, a compact-disc (CD) media, and a digital versatile disc (DVD) media.

Additionally, the memory unit includes a driver operatively controlled by the controller, and an optical interface operatively associated with the driver, the controller and the all-optical flash memory device and capable of converting the optical information into the form suitable for storage in the information storage element and vice versa. The optical interface preferably includes an optical transceiver.

There is also provided in accordance with a further preferred embodiment of the present invention an all-optical memory device for storing an optical signal representing optical information, the device including an optical compactor operative to optically compact the optical signal thereby providing a compacted optical signal, and an optical memory cell (OMC) operatively associated with the optical compactor and operative to store the compacted optical signal for a period of time.

Preferably, the optical signal includes a multiplicity of bits and the optical compactor includes a first coupler/decoupler operative to receive the optical signal and to output NF pattern replicas of the optical signal, where NF is an integer greater than one, NF optical gates operatively associated with the first coupler/decoupler, each of the NF optical gates being time-delay controlled to output chopped bits of a respective one of the NF pattern replicas of the optical signal at a different time window, and a second coupler/decoupler operatively associated with the NF optical gates and the OMC and operative to combine the chopped bits corresponding to the NF pattern replicas of the optical signal thereby forming the compacted optical signal, and to provide the compacted optical signal to the OMC.

The all-optical memory device also preferably includes an optical expander operatively associated with the OMC and operative to expand the compacted optical signal on retrieval from the OMC thereby restoring the optical signal.

In accordance with yet a further preferred embodiment of the present invention there is provided an all-optical memory device for storage and retrieval of LK optical signals respectively carried over LK separate carrier wavelengths $\lambda_1, \ldots, \lambda_{LK}$ where LK is an integer greater than one, the device including a first set of LK optical regeneration gates, each optical regeneration gate in the first set of LK optical regeneration gates being operative to receive a respective one of the LK optical signals and an optical-clock (OC) signal at a wavelength $\lambda_{OC}$, and time-delay controlled to output chopped bits of the respective one of the LK optical signals over $\lambda_{OC}$ at a different time window, a coupler operatively associated with the first set of LK optical regeneration gates and operative to combine the chopped bits corresponding to the LK optical signals to form a compacted optical signal representing a combination of the LK optical signals in a compacted form, and an OMC operatively associated with the coupler and operative to store the compacted optical signal for a period of time.

Additionally, the all-optical memory device includes a decoupler operatively associated with the OMC and operative to decouple the compacted optical signal, upon retrieval from the OMC, into LK pattern replicas of the compacted optical signal that are each carried over a wavelength $\lambda_{OUT}$, and a second set of LK optical regeneration gates operatively associated with the decoupler, the LK optical regeneration gates in the second set of LK optical regeneration gates being operative to receive the LK pattern replicas of the compacted optical signal and LK optical-clock signals carried over $\lambda'_1, \ldots, \lambda'_{LK}$ and to regenerate the LK optical signals over $\lambda'_1, \ldots, \lambda'_{LK}$.

Preferably, $\lambda'_1=\lambda_1, \ldots, \lambda'_{LK}=\lambda_{LK}$ and $\lambda_{OUT}=\lambda_{OC}$.

There is also provided in accordance with a preferred embodiment of the present invention a method for configuring a configurable integrated optical gate matrix that includes a set of nonlinear elements, the method including configuring a first subset of the set of nonlinear elements to function as a set of ON/OFF switches in the "OFF" state to enable a second subset of the set of nonlinear elements to be configured in at least one optical processing configuration.

Additionally, the method also includes the step of configuring the second subset of the set of nonlinear elements in the at least one optical processing configuration.

Further additionally, the method also includes the step of programmably selecting at least one of the following: a number of nonlinear elements in the first subset, a number of nonlinear elements in the second subset, a distribution of the nonlinear elements in the first subset, and a distribution of the nonlinear elements in the second subset.

The at least one optical processing configuration preferably includes at least one of the following configurations: a configuration for all-optical 2R regeneration, a configuration for all-optical 3R regeneration, a configuration for wavelength conversion, a configuration for data format conversion, a configuration for demultiplexing, a configuration for clock recovery, a configuration for a logic operation, and a configuration for dispersion compensation.

In accordance with a further preferred embodiment of the present invention there is provided a method for selectively performing on an input optical signal an optical processing operation and a switching operation, the method including providing a first nonlinear element, and a set of nonlinear elements including a second nonlinear element and not including the first nonlinear element, configuring the set of nonlinear elements in an optical processing configuration, and enabling performance of the optical processing operation on the input optical signal by the set of nonlinear elements to output an optical processing result to a first output route when the second nonlinear element is turned to an "ON" state and the first nonlinear element is turned to an "OFF" state, and switching the input optical signal to a second output route by turning the first nonlinear element to an "ON" state when the second nonlinear element is turned to an "OFF" state.

Preferably, the optical processing operation includes at least one of the following: all-optical 2R regeneration, all-optical 3R regeneration, wavelength conversion, data format conversion, demultiplexing, clock recovery, a logic operation, and dispersion compensation.

Yet further in accordance with a preferred embodiment of the present invention there is provided a method for storing optical information, the method including determining whether the optical information is to be stored for a time period exceeding a threshold or for a time period not exceeding the threshold, performing all-optical flash storage of the optical information in an all-optical flash memory device for the time period not exceeding the threshold, and, if the optical information is to be stored for the time period exceeding the threshold, receiving the optical information from the all-optical flash memory device, and storing a representation of the optical information in an information storage element in a form suitable for storage in the information storage element for an additional time period to reach the time period exceeding the threshold.

There is also provided in accordance with a preferred embodiment of the present invention a method for optically storing an optical signal representing optical information, the method including optically compacting the optical signal thereby providing a compacted optical signal, and optically storing the compacted optical signal for a period of time.

Further in accordance with a preferred embodiment of the present invention there is provided a method for optically compacting an optical signal including a multiplicity of bits, the method including replicating the optical signal to obtain NF pattern replicas of the optical signal, where NF is an integer greater than one, generating, from each of the NF pattern replicas of the optical signal, chopped bits at a different time window, and combining the chopped bits corresponding to the NF pattern replicas of the optical signal thereby forming a compacted optical signal representing the optical signal in a compacted form.

Still further in accordance with a preferred embodiment of the present invention there is provided a method for enabling optical storage and retrieval of LK optical signals respectively carried over LK separate carrier wavelengths $\lambda_1, \ldots, \lambda_{LK}$ where LK is an integer greater than one, the method including generating, from each of the LK optical signals and an OC signal at a wavelength $\lambda_{OC}$, chopped bits over $\lambda_{OC}$ at a different time window, and combining the chopped bits corresponding to the LK optical signals to form a compacted optical signal representing a combination of the LK optical signals in a compacted form for storing the compacted optical signal for a period of time.

Additionally, the method also includes decoupling the compacted optical signal upon retrieval into LK pattern replicas of the compacted optical signal that are each carried over a wavelength $\lambda_{OUT}$, and regenerating the LK optical signals over $\lambda'_1, \ldots, \lambda'_{LK}$ from the LK pattern replicas of the compacted optical signal and LK optical-clock signals carried over $\lambda'_1, \ldots, \lambda'_{LK}$.

BRIEF DESCRIPTION OF THE DRAWINGS

The present invention will be understood and appreciated more fully from the following detailed description, taken in conjunction with the drawings in which:

FIG. 11 is a simplified flowchart illustration of a preferred method of operation of the all-optical memory device of FIG. 5.

DETAILED DESCRIPTION OF A PREFERRED EMBODIMENT

Figure 1:
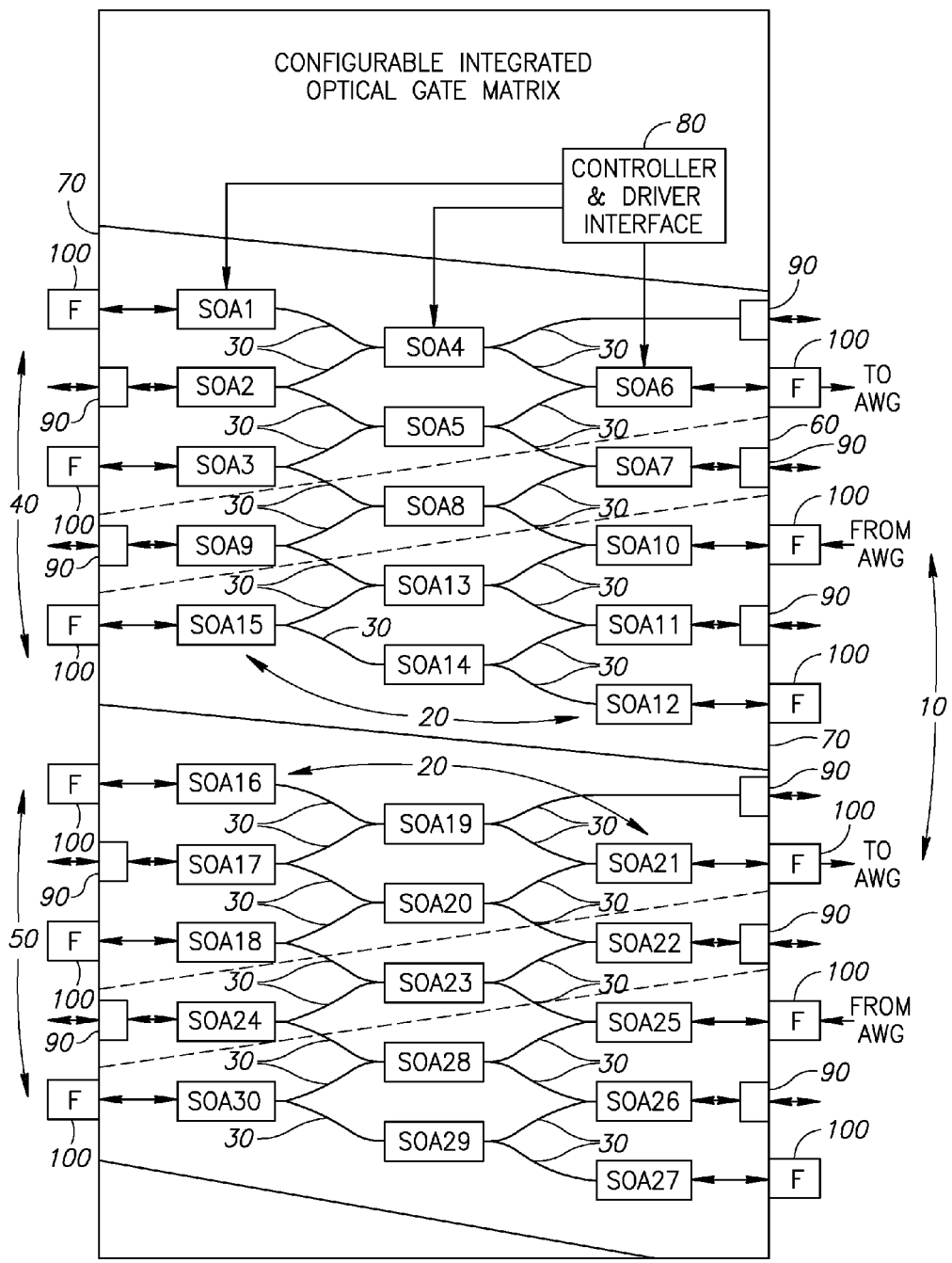
FIG. 1 is a simplified partly pictorial partly block diagram illustration of a preferred implementation of a configurable integrated optical gate matrix, the optical gate matrix being constructed and operative in accordance with a preferred embodiment of the present invention.

Reference is now made to FIG. 1 which is a simplified partly pictorial partly block diagram illustration of a preferred implementation of a configurable integrated optical gate matrix 10, the optical gate matrix 10 being constructed and operative in accordance with a preferred embodiment of the present invention. The optical gate matrix 10 may, for example and without limiting the generality of the description, be comprised in an optical processing unit (OPU) (not shown) that may perform one or more optical processing operations.

The term "optical processing operation" is used throughout the specification and claims to include at least one of the following operations: all-optical 2R regeneration; all-optical 3R regeneration; wavelength conversion; data format conversion; demultiplexing; clock recovery; a logic operation; and dispersion compensation. The term "optical processing operation" may alternatively or additionally include other operations that involve optical processing. The term "2R regeneration" is used throughout the specification and claims to include re-amplifying and reshaping of a data pulse. The term "3R regeneration" is used throughout the specification and claims to include re-amplifying, reshaping and re-timing of a data pulse.

The optical gate matrix 10 preferably includes a set of nonlinear elements 20 and a plurality of waveguides 30 interconnecting at least some nonlinear elements in the set of nonlinear elements 20. Preferably, the set of nonlinear elements 20 is arranged essentially in a parallelogram matrix or a plurality of parallelogram matrices. Alternatively, the set of nonlinear elements 20 may be arranged in any other appropriate arrangement, such as a rectangular arrangement (not shown) in which the set of nonlinear elements 20 is confined in a rectangle and at least some nonlinear elements in the set of nonlinear elements 20 are horizontally tilted with respect to the rectangle sides.

The term "nonlinear element" is used throughout the specification and claims to include an element having nonlinear properties or an element in which at least one nonlinear phenomenon may occur. The term "nonlinear element" is not limited to elements having only nonlinear properties or elements in which only nonlinear phenomena may occur. Rather, the term "nonlinear element" also refers to elements that may have linear properties in addition to nonlinear properties, and to elements in which linear phenomena may occur in addition to nonlinear phenomena. A nonlinear element based on semiconductor optical amplifiers (SOAs) which is well known in the art is one appropriate example of a nonlinear element. Other appropriate examples of nonlinear elements include nonlinear elements based on waveguide devices and nonlinear elements based on electro-optic nonlinear materials, such as lithium niobate.

By way of example, the set of nonlinear elements 20 in FIG. 1 includes nonlinear elements based on SOAs, but such example is not to be considered as limiting. Further by way of example which is not to be considered as limiting, the set of nonlinear elements 20 in FIG. 1 includes thirty elements, and the thirty elements are SOAs indicated SOA1, . . . , SOA30 and arranged in two parallelograms indicated by reference numerals 40 and 50. By way of example, each of the parallelograms 40 and 50 includes fifteen SOAs. In the example depicted in FIG. 1 there are no waveguides 30 that connect nonlinear elements in the parallelogram 40 to nonlinear elements in the parallelogram 50 and the parallelograms 40 and 50 are therefore isolated from each other. It is however appreciated that the parallelograms 40 and 50 may alternatively be non-isolated.

In accordance with a preferred embodiment of the present invention, a first subset 60 of the set of nonlinear elements 20 is configured to function as a set of ON/OFF switches in the "OFF" state to enable a second subset 70 of the set of nonlinear elements 20 to be configured in at least one optical processing configuration. The second subset 70 of the set of nonlinear elements 20 may then preferably be configured in the at least one optical processing configuration.

The at least one optical processing configuration preferably includes at least one of the following configurations: a configuration for all-optical 2R regeneration; a configuration for all-optical 3R regeneration; a configuration for wavelength conversion; a configuration for data format conversion; a configuration for demultiplexing; a configuration for clock recovery; a configuration for a logic operation; and a configuration for dispersion compensation. It is appreciated that the configuration for data format conversion may include, for example, a configuration for all-optical data format conversion between return-to-zero (RZ) and non-return-to-zero (NRZ) data formats.

Preferably, the at least one optical processing configuration is implemented by at least one of the following configurations: at least one interferometric configuration; at least one configuration that enables cross gain modulation (XGM); at least one configuration that enables four-wave mixing (FWM); and a combination of at least two of the following: at least one interferometric configuration; at least one configuration that enables XGM; and at least one configuration that enables FWM. The at least one interferometric configuration preferably includes at least one of the following: a Mach Zehnder interferometric (MZI) configuration; a Michelson interferometric (MI) configuration; and a delayed interference configuration.

The optical gate matrix 10 may also preferably include a controller and driver interface 80 that is operatively associated with the set of nonlinear elements 20. For simplicity of depiction, the controller and driver interface 80 is shown in FIG. 1 to be associated with only some nonlinear elements 20, but it is appreciated that the controller and driver interface 80 may preferably be associated with all of the nonlinear elements 20. The controller and driver interface 80 may, for example, include conventional electrical circuitry (not shown) that may be operatively associated with each of the nonlinear elements 20 and operative to provide an electrical interface to an external controller and driver (not shown). It is appreciated that the electrical interface provided by the controller and driver interface 80 may also be suitable for interfacing other appropriate external electrical/electronic devices and electrical power supply devices (not shown).

Preferably, the electrical interface provided by the controller and driver interface 80 may be used as an interface for enabling programmable selection by the controller and driver of at least one of the following: a number of nonlinear elements in the first subset 60; a number of nonlinear elements in the second subset 70; a distribution of the nonlinear elements in the first subset 60; and a distribution of the nonlinear elements in the second subset 70. The controller and driver may also preferably control and drive, as necessary, any nonlinear element in the set of nonlinear elements 20 via the controller and driver interface 80. Driving of any nonlinear element in the set of nonlinear elements 20 may include, for example, at least one of the following: application of an appropriate bias voltage; feeding of a continuous-wave (CW) signal; and feeding of a clock signal.

The optical gate matrix 10 may additionally include input/output (I/O) ports 90 that are operative to direct light into and/or out of at least some nonlinear elements in the set of nonlinear elements 20. The I/O ports 90 may preferably be used for input or output of light signals that do not need optical filtering when inputted to or outputted from the optical gate matrix 10.

The optical gate matrix 10 may also preferably include optical filters 100 that are operative to direct light at selective wavelengths into and/or out of at least some nonlinear elements in the set of nonlinear elements 20. The optical filters 100 may preferably be used to filter light signals that need optical filtering when is inputted to or outputted from the optical gate matrix 10. The selective wavelengths may, for example, include distinct wavelengths, distinct wavelength bands, or a combination of distinct wavelengths and at least one wavelength band.

It is appreciated that the optical gate matrix 10 is programmable as well as configurable. Programmability of the optical gate matrix 10 may, for example, be obtained through the programmable selection of the number and distribution of nonlinear elements in any of the subsets 60 and 70 as mentioned above. Such programmable selection of the number and distribution of nonlinear elements in any of the subsets 60 and 70 also renders the optical gate matrix 10 configurable because, for example, a specific nonlinear element may, in different selections, belong to different ones of the subsets 60 and 70 and thus have different functionality. Furthermore, the optical gate matrix 10 is programmable and configurable through different functionality of the nonlinear elements that may depend, for example, on an optical gate configuration in which the nonlinear elements participate.

The operation and usage of the optical gate matrix 10 is now briefly described.

Preferably, the optical gate matrix 10 is used to perform a variety of optical processing operations separately or in combination. Once a set of required optical processing operations is determined, the first subset 60 and the second subset 70 may be selected and configured.

Preferably, the second subset 70 actually performs the set of required optical processing operations through appropriate inter-configurations of the nonlinear elements that are comprised in the second subset 70, where each inter-configuration of the second subset 70 enables performance of one or more optical processing operations. The first subset 60 preferably separates and/or isolates the inter-configurations of the second subset 70 to prevent interference between the inter-configurations of the second subset 70 or to the inter-configurations of the second subset 70 thereby enabling proper performance of the optical processing operations by the second subset 70. It is appreciated that appropriate inter-configurations of the nonlinear elements that are comprised in the first subset 60 are is preferably used for actual separation and/or isolation of the inter-configurations of the second subset 70.

Some non-limiting examples of selections and configurations of the first subset 60 and the second subset 70 that may be used to perform different optical processing operations are described herein below for nonlinear elements 20 in the parallelogram 40 only. It is however appreciated that similar or different examples may be implemented in the parallelogram 50.

In a first example, the first subset 60 is selected to include SOA7, SOA8 and SOA9 and the second subset 70 is selected to include SOA11, . . . , SOA6 and SOA10, . . . , SOA15. SOA7, SOA8 and SOA9 are preferably configured to function as ON/OFF switches in the "OFF" state, for example by not applying a bias voltage to SOA7, SOA8 and SOA9. It is appreciated that configuration of SOA7, SOA8 and SOA9 in the "OFF" state isolates SOA1, . . . , SOA6 from SOA10, . . . , SOA15.

SOA1, . . . , SOA6 may then preferably be configured, for example in a first inter-configuration that enables performance of a first optical processing operation outputting a first output signal resulting from the first optical processing operation via SOA6. SOA10, . . . , SOA15 may preferably be configured, for example in a second inter-configuration that enables performance of a second optical processing operation outputting a second output signal resulting from the second optical processing operation via SOA15. Such configurations of the first subset 60 and the second subset 70 thus enable performance of two separate optical processing operations.

The first output signal and the second output signal are preferably outputted in essentially opposite directions. It is appreciated that the second subset 70 may also be configured to include other nonlinear element configurations outputting at least some optical signals in essentially opposite directions.

The first inter-configuration and the second inter-configuration may, for example, be configurations for identical optical processing operations to be performed, for example, on different input signals. For example, both the first and the second inter-configurations may be MZI interferometric configurations for all-optical 2R regeneration as used, for example, in the above-mentioned article entitled "40-Gb/s All-Optical Wavelength Conversion, Regeneration, and Demultiplexing in an SOA-Based All-Active Mach-Zehnder Interferometer", by Wolfson et al in *IEEE Photonics Technology Letters,* Vol. 12, No. 3, March 2000, pages 332-334 the disclosure of which is hereby incorporated herein by reference. In such a case, all-optical 2R regeneration in the first inter-configuration that results in the first output signal may be achieved by feeding a first input signal to SOA1, a delayed replica of the first input signal to SOA3, and a CW signal to SOA2. Similarly, all-optical 2R regeneration in the second inter-configuration that results in the second output signal may be achieved by feeding a second input signal to SOA10, a delayed replica of the second input signal to SOA12, and a CW signal to SOA11. It is appreciated that in the first inter-configuration the first output signal is a 2R-regeneration of the first input signal, and in the second inter-configuration the second output signal is a 2R-regeneration of the second input signal.

The first inter-configuration and the second inter-configuration may alternatively be configurations for different optical processing operations. For example, the first inter-configuration may be an MZI interferometric configuration for all-optical 2R regeneration as described above, and the second inter-configuration may be an MZI interferometric configuration for all-optical 3R regeneration. The all-optical 3R regeneration may be achieved similarly to all-optical 2R regeneration except for using an optical-clock (OC) signal instead of a CW signal.

It is appreciated that usage of the first subset 60 in which SOA7, SOA8 and SOA9 are maintained in the "OFF" state prevents interference between the first inter-configuration and the second inter-configuration of the second subset 70. If, for example the first subset 60 would have not been used and SOA7, SOA8 and SOA9 would have each been maintained in the "ON" state, an input to SOA3 would have interfered with an input to SOA10 through SOA8. In such a case, the first inter-configuration and the second inter-configuration of the second subset 70 would have not enabled proper performance of the optical processing operations.

Preferably, the optical processing operations enabled by any of the first and the second inter-configurations may be used for various applications. For example, the optical processing operations enabled by the first and the second inter-configurations may be optical processing operations intended for performance in a communication switch (not shown) to regenerate optical signals arriving at the communication switch. In such a case, the first output signal may, for example, be a regeneration of a downstream optical signal and the second output signal may, for example, be a regeneration of an upstream optical signal. The upstream optical signal may, for example, arrive to the optical gate matrix 10 via an arrayed waveguide grating (AWG) (not shown) and the first output signal may be routed to a destination (not shown)

via the AWG. It is appreciated that the AWG, as well as the optical gate matrix 10, may form part of the communication switch.

In the first example, the first subset 60 includes nonlinear elements arranged in a slant row of the parallelogram 40. The slant row comprising SOA7, SOA8 and SOA9 forms a border zone separating the first inter-configuration of the second subset 70 including SOA1, . . . , SOA6 from the second inter-configuration of the second subset 70 including SOA10, . . . ,SOA15. However, the nonlinear elements in the first subset 60 need not necessarily be arranged in a row, and other arrangements may alternatively be used.

In a second example, SOA3, SOA5, SOA14 and SOA15 are preferably selected for inclusion in the first subset 60 and SOA1, SOA2, SOA4, SOA6, . . . , SOA11 and SOA13 are preferably selected for inclusion in the second subset 70. It is noted that in general the first subset 60 and the second subset 70 need not necessarily together include all the nonlinear elements of the parallelogram 40 and in particular in the second example SOA12 may remain unassigned.

Preferably, SOA3, SOA5, SOA14 and SOA15 are configured to function as ON/OFF switches in the "OFF" state, for example by not applying a bias voltage to SOA3, SOA5, SOA14 and SOA15. Then, SOA1, SOA2, SOA4 and SOA6 may preferably be configured in a third inter-configuration and SOA7, . . . , SOA11 and SOA13 may preferably be configured in a fourth inter-configuration.

In the third inter-configuration SOA1 and SOA2 may, for example, be configured in a cross-phase modulated (XPM) configuration as described in the above mentioned article entitled "All-optical converters promise improved networks", by Jeff Hecht in *Laser Focus World*, April 2001, pages 159-164 the disclosure of which is hereby incorporated herein by reference. Preferably, if the XPM configuration is an MI configuration that requires additional elements as described in this article by Jeff Hecht, the additional elements, such as an optical circulator, a filter, and a CW signal source (all three not shown), may preferably be external to the optical gate matrix 10 and in operative association with the optical gate matrix 10, for example via SOA6 or a filter 100 associated with SOA6. The XPM configuration implemented through the MI configuration may, for example, be used as a XOR gate as described in the article "Semiconductor Optical Amplifier-Based All-Optical Gates for High-Speed Optical Processing", by Kristian E. Stubkjaer in *IEEE Journal on Selected Topics in Quantum Electronics,* Vol. 6, No. 6, November/December 2000, pages 1428-1435 that is mentioned above and whose disclosure is hereby incorporated herein by reference.

It is appreciated that SOA1 and SOA2 may be used in the MI configuration if they include reflective facets as is well known in the art. If SOA1 and SOA2 do not include reflective facets, external reflective elements (not shown) must be associated with SOA1 and SOA2 to complete the MI configuration.

Further in the third inter-configuration, SOA4 and SOA6 may be configured in the "ON" state to function simply as pass-through elements or as optical amplifiers.

In the fourth inter-configuration SOA7, . . . , SOA11 and SOA13 may be configured, for example, in an MZI interferometric configuration for all-optical 2R or 3R regeneration as described above with reference to the first example.

Preferably, configuring, in the second example, SOA3 and SOA5 to function as ON/OFF switches in the "OFF" state is used, as in the first example, to prevent interference between inter-configurations of the second subset 70. However, SOA14 and SOA15 are preferably configured in the "OFF" state to prevent interference with the fourth inter-configuration only.

In each of the first and second examples mentioned above, the subset is 70 in the parallelogram 40 includes, by way of example, only two separate configurations for optical processing operations but this number is not to be considered as limiting. Rather, the subset 70 in the parallelogram 40 may be configured in more than two separate configurations for optical processing operations. Additionally, more configurations for optical processing operations may be obtained by increasing the number of nonlinear elements in the parallelogram 40.

In FIG. 1, the optical gate matrix 10 is shown, by way of example, to include only two parallelograms, that is the parallelograms 40 and 50, and the parallelograms 40 and 50 are shown, by way of example, to have a similar number of nonlinear elements. It is however appreciated that the optical gate matrix 10 may alternatively include one parallelogram or more than two parallelograms. In any case in which the optical gate matrix 10 includes more than one parallelogram, the number of nonlinear elements in the parallelograms may be identical or different.

As the number of nonlinear elements in the optical gate matrix 10 increases, regardless of the number and/or size of the parallelograms defined in the optical gate matrix 10, more optical processing operations may, in principle, be performed by the optical gate matrix 10. An actual number of optical processing operations that may be performed by the optical gate matrix 10 will however also depend, inter alia, on the type of configurations selected for the optical processing operations.

It is appreciated that inter-configurations of the second subset 70 may be used in a cascaded form to perform more than one optical processing operation on an inputted optical signal. In such a case, an output signal resulting from one optical processing operation performed on the inputted optical signal may undergo another optical processing operation.

Figure 2:
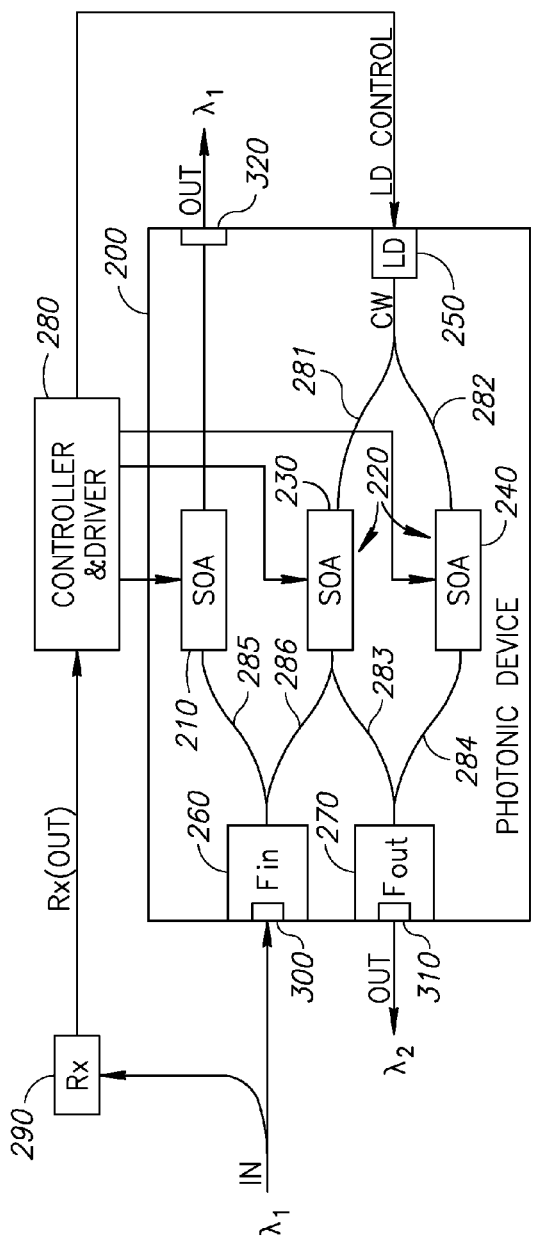
FIG. 2 is a simplified partly pictorial partly block diagram illustration of a preferred implementation of a photonic device that may be usable in configurations of the optical gate matrix of FIG. 1, the photonic device being constructed and operative in accordance with a preferred embodiment of the present invention.

Reference is now additionally made to FIG. 2 which is a simplified partly pictorial partly block diagram illustration of a preferred implementation of a photonic device 200, the photonic device 200 being constructed and operative in accordance with a preferred embodiment of the present invention. It is appreciated that the photonic device 200 may be a stand-alone device that performs integrated operations or implemented and used in the optical gate matrix 10, for example in configurations of the optical gate matrix 10. When implemented and used in configurations of the optical gate matrix 10, the photonic device 200 is preferably implemented in inter-configurations of the second subset 70 and used to enable performance of integrated operations.

The photonic device 200 preferably includes a first nonlinear element 210 and a set of nonlinear elements 220 including a second nonlinear element 230. Preferably, the set of nonlinear elements 220 does not include the first nonlinear element 210 but it may include other nonlinear elements in addition to the second nonlinear element 230, such as a nonlinear element 240. By way of example, which is not to be considered as limiting, all the nonlinear elements in the photonic device 200 comprise nonlinear elements based on SOAs.

Preferably, the set of nonlinear elements 220 is configured in an optical processing configuration. By way of example, in FIG. 2 the optical processing configuration in which the set of nonlinear elements 220 is configured is an MZI interferometric configuration for wavelength conversion, but it is appreciated that other optical processing configurations may alternatively be used as mentioned above with reference to FIG. 1.

The photonic device 200 may also preferably include a laser diode (LD) 250 or an interface to an external LD (not shown), optical filters 260 and 270, and interfaces (not shown) to a controller and driver 280. The controller and driver 280 may, for example, be external to the photonic device 200 or integrated with the photonic device 200. The LD 250 is preferably interconnected, for example through waveguides 281 and 282, to the second nonlinear element 230 and the nonlinear element 240 respectively. The filter 270 is also preferably interconnected to the second nonlinear element 230 and the nonlinear element 240, for example through waveguides 283 and 284 respectively. The filter 260 is preferably interconnected, for example through waveguides 285 and 286, to the first nonlinear element 210 and the second nonlinear element 230 respectively.

Preferably, the photonic device 200 may be used to enable performance of integrated operations. For example, in a stand-alone implementation the photonic device 200 may be used to perform integrated operations when employed as a set of retransmission (or "rebound") elements (SORE) in an optical retransmission unit (ORU) of an all-optical memory or buffer as described in the above-mentioned U.S. patent application Ser. No. 10/152,289 the disclosure of which is hereby incorporated herein by reference.

The all-optical memory or buffer described in U.S. patent application Ser. No. 10/152,289 uses cyclical transmission of an optical signal between at least two ends of an optical medium so that each transmission of the optical signal in a direction via the optical medium is carried out over a wavelength resource which is different from a wavelength resource used in a preceding transmission of the optical signal in a direction via the optical medium. After, for example, many cyclical transmissions of the optical signal, a delayed replica of the optical signal is outputted from the all-optical memory or buffer. To enable operation of the all-optical memory or buffer as mentioned above, the photonic device 200 operating as a SORE may, for example, be required to perform the following operations: wavelength conversion, in a case where the wavelength resource is a wavelength; switching to output the delayed replica of the optical signal; and amplification of the optical signal (optional).

The switching to output the delayed replica of the optical signal may require detection of a portion of a guard period as discussed in U.S. patent application Ser. No. 10/152,289. The detection of the portion of the guard period is needed to determine when switching is to be carried out. The portion of the guard period may be detected by an external optical receiver 290 or alternatively by a nonlinear element detector (not shown) connected in series with the filter 260 and placed between the filter 260 and the nonlinear elements 210 and 230. Another operation that may be required in the all-optical memory or buffer described in U.S. patent application Ser. No. 10/152,289 is dispersion compensation.

In operation as a SORE, the photonic device 200 preferably performs integrated operations by performing at least some of the operations mentioned above simultaneously or at different times as necessary. For example, the photonic device 200 may preferably selectively perform an optical processing operation such as wavelength conversion and a switching operation on an input optical signal inputted, for example at an input port 300 of the photonic device 200. In such a case, the photonic device 200 is preferably controlled to enable performance of the optical processing operation on the input optical signal by the set of nonlinear elements 220 to output an optical processing result to a first output route when the second nonlinear element 230 is turned to an "ON" state and the first nonlinear element 210 is turned to an "OFF" state, and to switch the input optical signal to a second output route by turning the first nonlinear element 210 to an "ON" state when the second nonlinear element 230 is turned to an "OFF" state.

The first output route and the second output route may preferably be spatially and/or directionally separated. The first route may, for example, be provided via a first output port 310 of the photonic device 200 and the second route may, for example, be provided via a second output port 320 of the photonic device 200.

Referring now to a specific example, which is not to be considered as limiting, of operation of the photonic device 200 as a SORE, the optical medium may include a fiber optic cable and the input optical signal may, in an arbitrary transmission cycle via the fiber optic cable, arrive via the fiber optic cable to the input port 300 over a wavelength $\lambda_1$. It is appreciated that the optical medium is not limited to fiber optic cables, and any other suitable optical medium may alternatively or additionally be used as described in U.S. patent application Ser. No. 10/152,289, including, for example, a medium that is capable of slowing light.

Preferably, the filter 260 passes only optical signals carried over $\lambda_1$, and thus the filter 260 preferably passes the input optical signal over $\lambda_1$ to both the first nonlinear element 210 and the second nonlinear element 230 via the waveguides 285 and 286 respectively.

When the controller and driver 280 enables performance of the optical processing operation, the controller and driver 280 preferably turns the first nonlinear element 210 to the "OFF" state and the second nonlinear element 230 to the "ON" state. In such a case, the first nonlinear element 210 blocks the input optical signal, and the second nonlinear element 230 passes the input optical signal.

Preferably, the controller and driver 280 also drives the LD 250 which feeds a CW signal at a wavelength $\lambda_2$ to the set of nonlinear elements 220. The set of nonlinear elements 220 is therefore enabled as an XPM converter to perform the optical processing operation as described, for example in the above mentioned article entitled "All-optical converters promise improved networks", by Jeff Hecht in *Laser Focus World*, April 2001, pages 159-164 the disclosure of which is hereby incorporated herein by reference.

The optical processing operation performed by the XPM converter is, for example, wavelength conversion and it provides an optical processing result comprising a replica of the input optical signal that is carried over $\lambda_2$. The replica of the input optical signal carried over $\lambda_2$ is preferably directed to the filter 270 that preferably passes only optical signals carried over $\lambda_2$. The filter 270 therefore passes the replica of the input optical signal over $\lambda_2$ to the fiber optic cable via the first output port 310. It is appreciated that the input port 300 and the first output port 310 are typically operatively associated with the same fiber optic cable for optical reception and optical transmission respectively via a multiplexer/demultiplexer (not shown) as described in U.S. patent application Ser. No. 10/152,289.

It is thus noted that when the controller and driver 280 enables performance of the optical processing operation, the photonic device 200 converts the input optical signal received over $\lambda_1$ to a replica of the input optical signal that is carried over $\lambda_2$ and retransmits the replica of the input optical signal over $\lambda_2$ via the fiber optic cable.

It is appreciated that conversion of the input optical signal received over $\lambda_1$ to the replica carried over $\lambda_2$ also typically involves amplification. Thus, the replica of the input optical signal has the same pattern as the input optical signal but it may be amplified with respect to the input optical signal. In cases where amplification is not required, or rather attenuation is required, the input optical signal may, for example, be attenuated in a variable optical attenuator (VOA) (not shown) prior to input to the photonic device 200.

After a delay time period within which typically a plurality of transmission cycles are carried out to provide a delayed input optical signal, retransmission of the delayed input optical signal via the first output port 310 must be stopped as described in U.S. patent application Ser. No. 10/152,289. The delayed input optical signal may then be outputted via the second output port 320. The controller and driver 280 may preferably stop the retransmission of the delayed input optical signal and switch the delayed input optical signal to the second output port 320 by turning the first nonlinear element 210 to the "ON" state and the second nonlinear element 230 to the "OFF" state. The first nonlinear element 210 then passes the delayed input optical signal and the second nonlinear element 230 blocks the delayed input optical signal. Preferably, the controller and driver 280 also interrupts driving of the LD 250 when the first nonlinear element 210 is turned to the "ON" state and the second nonlinear element 230 is turned to the "OFF" state. It is appreciated that the first nonlinear element 210 may also amplify the delayed input optical signal on passage to the second output port 320.

It is thus noted that in its operation as a SORE the photonic device 200 may perform the operations of wavelength conversion, switching and amplifying in an integrated form.

Preferably, the photonic device 200 may also operate as a SORE to perform the operations of wavelength conversion, switching and amplifying in an integrated form when the set of nonlinear elements 220 is configured in an MI interferometric configuration for wavelength conversion rather than an MZI configuration. Appropriate MI interferometric configurations for wavelength conversion are described in the above mentioned article entitled "All-optical converters promise improved networks", by Jeff Hecht in *Laser Focus World*, April 2001, pages 159-164, and in the above mentioned article entitled "Semiconductor Optical Amplifier-Based All-Optical Gates for High-Speed Optical Processing", by Kristian E. Stubkjaer in *IEEE Journal on Selected Topics in Quantum Electronics*, Vol. 6, No. 6, November/December 2000, pages 1428-1435 the disclosures of which are hereby incorporated herein by reference.

The MI interferometric configuration may, for example, be enabled in the photonic device 200 by using nonlinear elements having reflective facets for the nonlinear elements 230 and 240, inserting an optical circulator (not shown) after the LD 250 so that the CW signal at $\lambda_2$ is fed through the optical circulator, and connecting a port of the optical circulator to the filter 270. It is appreciated that if the optical circulator cannot be integrated in the photonic device 200, the LD 250 and the optical circulator may be external to the photonic device 200.

Implementation of the photonic device 200 in the optical gate matrix 10 may, for example, be performed by implementing the nonlinear elements 210, 230 and 240 in SOA4, SOA5 and SOA8 respectively, turning SOA1 and SOA6 to the "OFF" state, turning SOA2, SOA3 and SOA7 to the "ON" state, and coupling a filter 100 to SOA2. In such an implementation, SOA2 may, for example, also amplify the input optical signal and may additionally replace the optical receiver 290 for detecting the portion of the guard period to determine when switching is to be carried out via SOA4.

Additionally, SOA3 may, for example, be pumped by two pump waves (not shown) on retransmission of the input optical signal to enable dispersion compensation as is well known in the art. It is therefore noted that in the implementation of the photonic device 200 in the optical gate matrix 10 performance of more operations is enabled than in the stand-alone implementation of the photonic device 200.

It is appreciated that driving functionality of the controller and driver 280 typically depends on implementations of the photonic device 200 and on configurations used in the optical gate matrix 10. The driving functionality preferably includes application or interruption, as necessary, of at least one of the following to any nonlinear element in the photonic device 200: a bias signal; a CW signal; and a clock signal.

Figure 3:
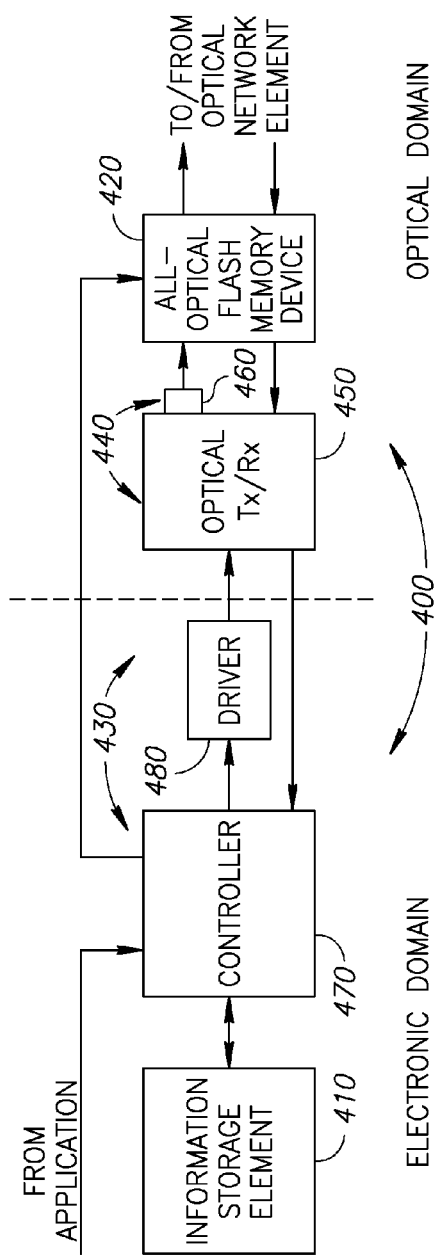
FIG. 3 is a simplified block diagram illustration of a preferred implementation of a memory unit usable with the optical gate matrix of FIG. 1 and the photonic device of FIG. 2, the memory unit being constructed and operative in accordance with a preferred embodiment of the present invention.

Reference is now made to FIG. 3 which is a simplified block diagram illustration of a preferred implementation of a memory unit 400, the memory unit 400 being constructed and operative in accordance with a preferred embodiment of the present invention. The memory unit 400 may preferably be used for storing optical information. It is appreciated that the memory unit 400 may, by way of example which is not to be considered as limiting, be usable with the optical gate matrix 10 of FIG. 1 and the photonic device 200 of FIG. 2.

Preferably, the memory unit 400 includes an information storage element 410 and an all-optical flash memory device 420. The information storage element 410 preferably includes at least one of the following storage media: a magnetic memory media; an electronic memory media; a magneto-optic memory media; a ferroelectric memory media; a magnetoresistive memory media; an Ovonic Unified Memory (OUM) media; a compact-disc (CD) media; and a digital versatile disc (DVD) media.

The memory unit 400 may also preferably include an electronic interface 430 that is operatively associated with the information storage element 410 and the all-optical flash memory device 420, and an optical interface 440 that is operatively associated with the electronic interface 430 and the all-optical flash memory device 420. The optical interface 440 preferably includes an optical transceiver (transmitter and receiver) 450 and, in a case where the optical transmitter in the optical transceiver 450 is not directly driven, an external modulator 460 for modulating an output of the optical transmitter.

The electronic interface 430 preferably includes a controller 470 and a driver 480 that is operatively controlled by the controller 470. The driver 480 is preferably operative to drive the optical transmitter in the optical transceiver 450.

The controller 470 is preferably operative to determine whether the optical information is to be stored for a time period exceeding a threshold or for a time period not exceeding the threshold. The controller 470 may further preferably be operative to control storage in and retrieval from the information storage element 410.

The all-optical flash memory device 420 is preferably operative to perform all-optical flash storage of the optical information for the time period not exceeding the threshold. If the optical information is to be stored for the time period exceeding the threshold, the information storage element 410 preferably receives the optical information from the all-optical flash memory device 420, and stores a representation of the optical information in a form suitable for storage in the information storage element 410 for an additional time period to reach the time period exceeding the threshold. It is appreciated that the optical interface 440 may preferably be capable of converting the optical information into the form suitable for storage in the information storage element 410 and vice versa.

The all-optical flash memory device 420 may, for example, be an all-optical buffer or an optical memory cell (OMC) of an all-optical memory that is capable of storing an entire optical signal that includes a plurality of bits as described in U.S.

patent application Ser. No. 10/152,289. In such a case, the all-optical flash memory device 420 may use the photonic device 200 of FIG. 2, or an implementation of the photonic device 200 as an optical gate matrix 10 of FIG. 1, for each ORU of the all-optical buffer or the OMC of the all-optical memory. Fiber optic cables (not shown) interconnecting ORUs may, for example, be used as an optical medium via which multiple cyclical transmissions of an optical signal to be stored are carried out. It is appreciated that other types of optical medium may be used, instead of or in addition to the fiber optic cables, such as a medium that is capable of slowing light as mentioned in U.S. patent application Ser. No. 10/152, 289.

The term "optical memory cell" is used throughout the specification and claims in a broad sense to include a device or element that is capable of all-optical storage of an optical signal and of controlling when to output the optical signal for retrieval. The optical memory cell may form part of an all-optical memory or may include an entire all-optical memory. The optical memory cell may store an optical signal or an optical packet including one or more bits.

In a case where the photonic device 200 of FIG. 2 is used in the all-optical flash memory device 420, the controller and driver 280 of FIG. 2 may be embodied in or associated with the all-optical flash memory device 420 and used as a memory controller to control storage in and retrieval from the all-optical flash memory device 420.

The information storage element 410 is typically suitable for long storage periods but it typically has a relatively long access time and storage of the optical information in it requires conversion of the optical information into the form suitable for storage in the information storage element 410. The all-optical flash memory device 420, however, has a typically short access time and it can perform all-optical storage of the optical information but it is typically suitable for only short storage periods. Therefore, if the optical information must be stored for the time period not exceeding the threshold, it can be stored only in the all-optical flash memory device 420. However, if the optical information must be stored for the time period exceeding the threshold, storage in the information storage element 410 must be used in addition to storage in the all-optical flash memory device 420. The threshold is preferably used as a measure of a maximum or optimum storage time attainable in the all-optical flash memory device 420 beyond which storage in the information storage element 410 is required.

The memory unit 400 may therefore be useful, for example, in applications in which an optical signal must be stored for a relatively long time period and then retrieved and prepared for an operation that requires fast access.

One such application may be an optical switching application in which the optical signal includes, for example, an optical packet that must be delayed for a relatively long time period, such as 5 seconds, and then placed, for example, in a 100 nanosecond (nSec) long transmission queue for optical transmission to an optical network element (not shown). The threshold may be, for example, 10 microsecond (μSec).

Since the optical packet must be delayed for more than 10 μSec, the optical packet is preferably converted to a form suitable for storage in the information storage element 410, such an electronic form, thereby providing an electronic representation of the optical packet. The electronic representation of the optical packet is then preferably stored in the information storage element 410 to reach a total storage time of 5 seconds. It is appreciated that the controller 470 may even control the all-optical flash memory device 420 to provide the optical packet to the information storage element 410 with minimum delay in the all-optical flash memory device 420 thereby freeing the all-optical flash memory device 420 to accept other optical packets.

After the total storage time of 5 seconds, the electronic representation of the optical packet is preferably retrieved from the information storage element 410 and converted by the optical interface 440 to a pattern replica of the optical packet. The pattern replica of the optical packet is then preferably stored in the all-optical flash memory device 420 for 100 nSec or less until it can be placed in the transmission queue for optical transmission to the optical network element. It is appreciated that before placement in the transmission queue, the pattern replica of the optical packet may even undergo in the all-optical flash memory device 420 an optical processing operation, such as wavelength conversion.

The operation of the memory unit 400 is now briefly described. In a first operation mode, information generated, for example by an application, may be stored in an electronic form in the information storage element 410. After an appropriate storage time, the controller 470 may preferably retrieve the electronic information from the information storage element 410 and actuate the driver 480 to drive the optical transmitter in the optical transceiver 450 for generating an optical representation of the electronic information. The optical representation of the electronic information may then preferably be fed to the all-optical flash memory device 420 that performs flash storage of the optical representation of the electronic information in preparation for, for example, placing the optical representation of the electronic information in a queue for optical transmission. The queue for optical transmission may be provided, for example, by conventional transmission equipment (not shown) that may be associated with the memory unit 400.

In a second operation mode, an input optical signal that, for example, must be delayed before switching to a destination may preferably be provided to the all-optical flash memory device 420 for flash storage. If the input optical signal must be delayed for a time period not exceeding the threshold, the input optical signal is preferably outputted after the flash storage in the all-optical flash memory device 420. If the input optical signal must be delayed for a time period exceeding the threshold, the input optical signal is preferably further provided to the information storage element 410 for storage for an additional time period to reach the time period exceeding the threshold.

Figure 4:
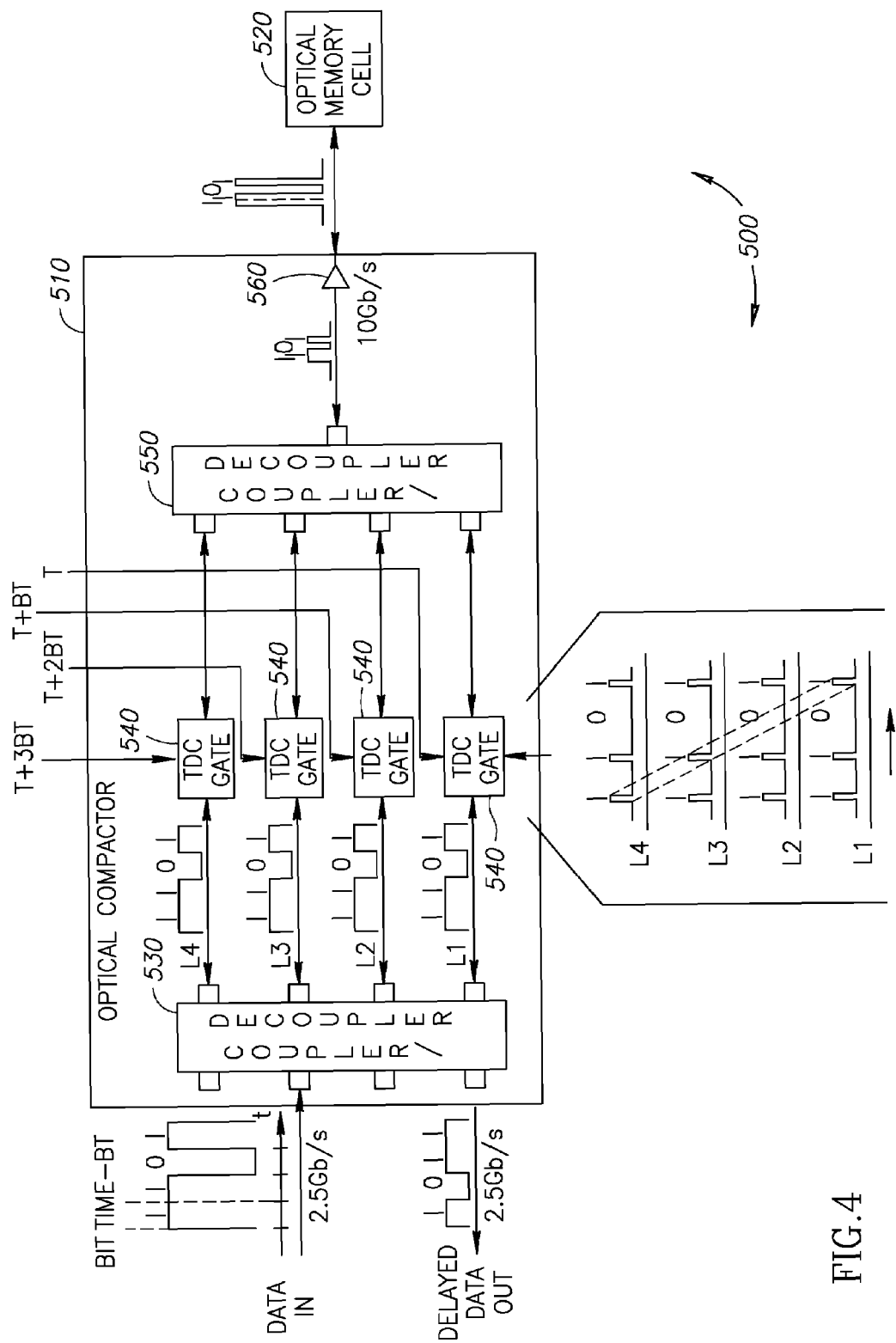
FIG. 4 is a simplified partly pictorial partly block diagram illustration of a preferred implementation of an all-optical memory device usable in the memory unit of FIG. 3, the all-optical memory device being constructed and operative in accordance with a preferred embodiment of the present invention.

Reference is now made to FIG. 4 which is a simplified partly pictorial is partly block diagram illustration of a preferred implementation of an all-optical memory device 500 usable in the memory unit 400 of FIG. 3, the all-optical memory device 500 being constructed and operative in accordance with a preferred embodiment of the present invention. The all-optical memory device 500 is preferably useful for storing and retrieving an optical signal representing optical information and may, for example, replace the all-optical flash memory device 420 of FIG. 3. It is appreciated that the optical signal typically includes a multiplicity of bits with a bit-time being indicated as "BT".

Preferably, the all-optical memory device 500 includes an optical compactor 510 and an OMC 520. The optical compactor 510 is preferably operative to optically compact the optical signal thereby providing a compacted optical signal. The OMC 520 is preferably operatively associated with the optical compactor 510 and is operative to store the compacted optical signal for a period of time. The OMC 520 may, for example, include an OMC as described in the above-mentioned U.S. patent application Ser. No. 10/152,289 that uses wavelength conversion together with cyclical transmission of the compacted optical signal.

The optical compactor 510 preferably includes the following elements: a first coupler/decoupler 530; NF optical gates 540, where NF is an integer greater than one; and a second coupler/decoupler 550. The optical compactor 510 may also preferably include, or be associated with, an optical amplifier 560.

The first coupler/decoupler 530 is preferably operative to receive the optical signal and to split the optical signal for outputting NF pattern replicas of the optical signal. The NF optical gates 540 are preferably operatively associated with the first coupler/decoupler 530, and each of the NF optical gates 540 preferably receives a respective one of the NF pattern replicas of the optical signal. Each of the NF optical gates 540 is preferably time-delay controlled (TDC) to output chopped bits of the respective one of the NF pattern replicas of the optical signal at a different time window.

The second coupler/decoupler 550 is preferably operatively associated with the NF optical gates 540 and the OMC 520. Preferably, the second coupler/decoupler 550 is operative to combine the chopped bits corresponding to the NF pattern replicas of the optical signal thereby forming the compacted optical signal representing the optical signal in a compacted form. The second coupler/decoupler 550 then preferably provides the compacted optical signal to the OMC 520.

Each of the NF optical gates 540 may, for example, include six SOAs (not shown) and an output filter (not shown) arranged in an MZI gate arrangement that is operated in a differential operation mode to create short-switching windows. Such an MZI gate arrangement is described, for example, in the above-mentioned article "Semiconductor Optical Amplifier-Based All-Optical Gates for High-Speed Optical Processing", by Kristian E. Stubkjaer in *IEEE Journal on Selected Topics in Quantum Electronics,* Vol. 6, No. 6, November/December 2000, pages 1428-1435, the disclosure of which is hereby incorporated herein by reference. MZI gate arrangements suitable for one or more of the NF optical gates 540 may, for example, be implemented in the optical gate matrix 10 of FIG. 1.

It is appreciated that there various ways in which the NF optical gates 540 may be time-delay controlled. For example, the NF optical gates 540 may be time-delay controlled by creating time shifts with an increment of BT between outputs of the NF optical gates 540. Alternatively, time shifts with a BT increment may be created between the NF pattern replicas of the optical signal on input to the NF optical gates 540. In MZI gate arrangements of the NF optical gates 540, the time shifts between the outputs of the NF optical gates 540 may be created, for example, by phase-shift operating the corresponding output SOAs, and the time shifts between the NF pattern replicas of the optical signal may be created, for example, by phase-shift operating the corresponding SOAs of the MZI signal input arms.

It is appreciated that the NF optical gates 540 may alternatively be time-delay controlled with a zero delay time in a case where optical paths of different lengths (not shown) are selected and used on input to or output of the NF optical gates 540 to create optical delays with a BT increment.

The all-optical memory device 500 may also preferably include an optical expander operatively associated with the OMC 520 and operative to expand the compacted optical signal on retrieval from the OMC 520 thereby restoring the optical signal. The optical expander may, for example, be the optical compactor 510 operating inversely to expand the compacted optical signal on retrieval from the OMC 520. Alternatively, the optical expander may be a separate unit similar in structure to the optical compactor 510 and operating inversely to the optical compactor 510 to expand the compacted optical signal on retrieval from the OMC 520 by using, for example, pulse duplicators (not shown) in association with NF optical gates (not shown) corresponding to the NF optical gates 540.

In operation, an optical signal, for example an optical packet provided at a bit-rate of 2.5 gigabit per second (Gb/s) with bit-time BT, is split by the first coupler/decoupler 530 into, for example, four pattern replicas (NF=4) of the optical packet. Each of the four pattern replicas of the optical packet is preferably fed to a corresponding TDC gate 540 that preferably outputs to the second coupler/decoupler 550 chopped bits of the corresponding one of the four pattern replicas of the optical packet at a different time window. Each different time window is, for example, 0.25 BT in size and BT shifted with respect to a time window created by a nearest neighbor TDC gate 540.

The second coupler/decoupler 550 preferably combines the chopped bits corresponding to the four pattern replicas of the optical packet thereby forming a compacted optical packet at a bit-rate of 10 Gb/s. The second coupler/decoupler 550 then preferably provides the compacted optical packet at 10 Gb/s to the optical amplifier 560 that preferably amplifies the compacted optical packet before storage in the OMC 520.

Figure 5:
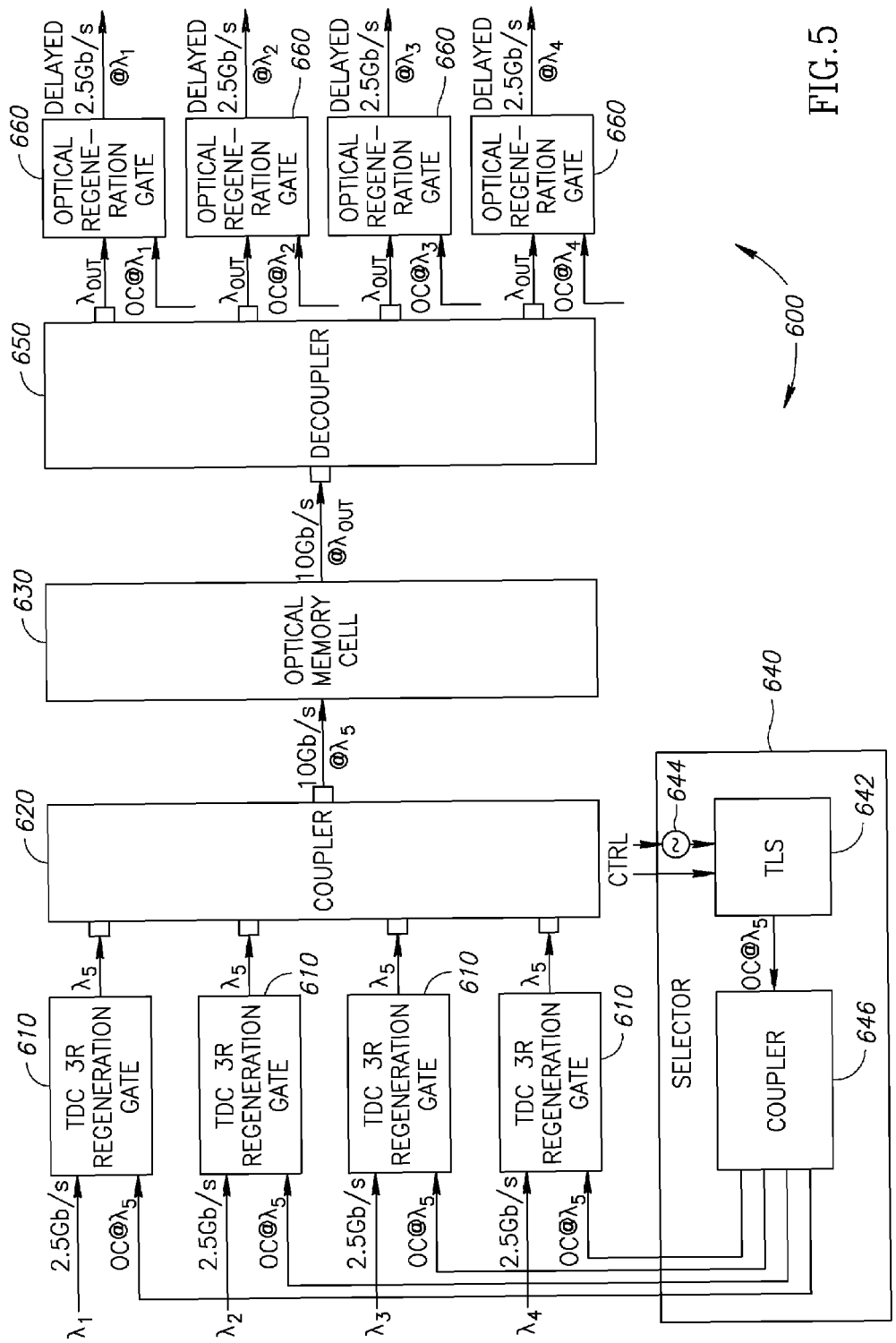
FIG. 5 is a simplified block diagram illustration of another preferred implementation of an all-optical memory device usable in the memory unit of FIG. 3.

Reference is now made to FIG. 5 which is a simplified block diagram illustration of another preferred implementation of an all-optical memory device 600 usable in the memory unit 400 of FIG. 3, the all-optical memory device 600 being constructed and operative in accordance with a preferred embodiment of the present invention. The all-optical memory device 600 is preferably useful for storing and retrieving LK optical signals that are respectively carried over LK separate carrier wavelengths $\lambda_1, \ldots, \lambda_{LK}$ where LK is an integer greater than one. It is appreciated that on input to the all-optical memory device 600, the LK separate carrier wavelengths $\lambda_1, \ldots, \lambda_{LK}$ may be provided via spatially separated routes without time synchronization between optical signals carried on different carrier wavelengths. For example, the LK separate carrier wavelengths $\lambda_1, \ldots, \lambda_{LK}$ may be wavelengths carried on separate fiber optic cables.

The all-optical memory device 600 may, for example, replace the all-optical flash memory device 420 of FIG. 3. It is appreciated that each of the LK optical signals typically includes a multiplicity of bits, and the LK optical signals may, for example, be provided at substantially similar data rates.

The all-optical memory device 600 preferably includes the following elements: a first set of LK optical regeneration gates 610; a coupler 620; and an OMC 630. It is appreciated that the OMC 630 may, for example, include an OMC as described in the above-mentioned U.S. patent application Ser. No. 10/152,289 that uses wavelength conversion together with cyclical transmission of an optical signal stored therein.

The all-optical memory device 600 may also preferably include a selector 640 for selecting a wavelength $\lambda_{OC}$ of an OC signal to be fed into each optical regeneration gate of the first set of LK optical regeneration gates 610. The OC signal may, for example, be generated in the selector 640 by a tunable laser source (TLS) 642 clocked by a clock 644. The OC signal is then split by a coupler/decoupler 646 into LK pattern replicas of the OC signal for feeding into the first set of LK optical regeneration gates 610. The TLS 642 and the clock 644 may preferably be controlled, for example, by an external controller (not shown) that may preferably select a clock frequency of the clock 644 and tune the TLS 642 to generate the OC signal at $\lambda_{OC}$.

Preferably, each optical regeneration gate in the first set of LK optical regeneration gates 610 is operative to receive a respective one of the LK optical signals and the OC signal at $\lambda_{OC}$ or its pattern replica. Each optical regeneration gate in the first set of LK optical regeneration gates 610 is also preferably time-delay controlled to output to the coupler 620 chopped bits of the respective one of the LK optical signals over $\lambda_{OC}$ at a different time window. The coupler 620 preferably combines the chopped bits corresponding to the LK optical signals to form a compacted optical signal at $\lambda_{OC}$ that represents a combination of the LK optical signals in a compacted form. The coupler 620 then outputs the compacted optical signal to the OMC 630. The OMC 630 preferably stores the compacted optical signal for a period of time.

Each optical regeneration gate in the first set of LK optical regeneration gates 610 may, for example, include six SOAs (not shown) and an output filter (not shown) arranged in an MZI configuration for all-optical 3R regeneration as described, for example, in the above-mentioned article "Semiconductor Optical Amplifier-Based All-Optical Gates for High-Speed Optical Processing", by Kristian E. Stubkjaer in *IEEE Journal on Selected Topics in Quantum Electronics,* Vol. 6, No. 6, November/December 2000, pages 1428-1435, and in the above-mentioned article entitled "40-Gb/s All-Optical Wavelength Conversion, Regeneration, and Demultiplexing in an SOA-Based All-Active Mach-Zehnder Interferometer", by Wolfson et al in *IEEE Photonics Technology Letters,* Vol. 12, No. 3, March 2000, pages 332-334. Such MZI configurations for all-optical 3R regeneration may, for example, be implemented in the optical gate matrix 10 of FIG. 1 for one or more optical regeneration gates 610.

It is appreciated that the optical regeneration gates in the first set of LK optical regeneration gates 610 may be time-delay controlled in various ways, for example, as described above with reference to FIG. 4.

For retrieval from the OMC 630, the all-optical memory device 600 may also preferably include a decoupler 650 and a second set of LK optical regeneration gates 660 that are operatively associated with the decoupler 650. The decoupler 650 is preferably operatively associated with the OMC 630 and operative to decouple the compacted optical signal, upon retrieval from the OMC 630, into LK pattern replicas of the compacted optical signal that are each carried over a wavelength $\lambda_{OUT}$. The LK optical regeneration gates in the second set of LK optical regeneration gates 660 are preferably operative to receive the LK pattern replicas of the compacted optical signal and LK optical-clock signals carried over $\lambda'_1, \ldots, \lambda'_{LK}$ and to regenerate the LK optical signals over $\lambda'_1, \ldots, \lambda'_{LK}$ using, for example, pulse duplicators (not shown) on output from the optical regeneration gates 660. The LK optical-clock signals carried over $\lambda'_1, \ldots, \lambda'_{LK}$ may, for example, be generated by a set of external TLSs (not shown) that are clocked by external clocks (not shown).

Each optical regeneration gate in the second set of LK optical regeneration gates 660 may, for example, include six SOAs (not shown) and an output filter (not shown) arranged in an MZI configuration for wavelength conversion and demultiplexing as described, for example, in the above-mentioned article entitled "40-Gb/s All-Optical Wavelength Conversion, Regeneration, and Demultiplexing in an SOA-Based All-Active Mach-Zehnder Interferometer", by Wolfson et al in *IEEE Photonics Technology Letters,* Vol. 12, No. 3, March 2000, pages 332-334. Such MZI configurations for wavelength conversion and demultiplexing may, for example, be implemented in the optical gate matrix 10 of FIG. 1 for one or more optical regeneration gates 660.

Preferably, but not necessarily, $\lambda'_1 = \lambda_1, \ldots, \lambda'_{LK} = \lambda_{LK}$ and $\lambda_{OUT} = \lambda_{OC}$. $\lambda'_1, \ldots, \lambda'_{LK}$ may alternatively include at least one wavelength which is not one of the wavelengths $\lambda_1, \ldots, \lambda_{LK}$. It is appreciated that even in a case where $\lambda_1, \ldots, \lambda_{LK}$ and $\lambda'_1, \ldots, \lambda'_{LK}$ include the same wavelengths, the regenerated LK optical signals may be outputted either in a respective form in which each optical signal is outputted over the same wavelength over which it was carried on input to the all-optical memory device 600, or in a non-respective form in which at least some optical signals may be outputted over wavelengths other than wavelengths over which the at least some optical signals were carried on input to the all-optical memory device 600.

It is appreciated that $\lambda_{OUT}$ may, for example, be determined by a memory controller (not shown) of the OMC 630. In a case where the OMC 630 includes an OMC as described in the above-mentioned U.S. patent application Ser. No. 10/152,289 that uses wavelength conversion together with cyclical transmission of the compacted optical signal, a determination of when to retrieve the compacted optical signal may affect determination of $\lambda_{OUT}$.

In an alternative embodiment, the first set of LK optical regeneration gates 610 may also have the functionality of the second set of LK optical regeneration gates 660, and the coupler 620 may also have the functionality of the decoupler 650. In such a case, the second set of LK optical regeneration gates 660 and the decoupler 650 may be excluded, and the first set of LK optical regeneration gates 610 and the coupler 620 may also appropriately operate in order to retrieve the compacted optical signal from the OMC 630.

In operation, LK optical signals to be stored are preferably provided to the first set of LK optical regeneration gates 610. In an example depicted in FIG. 5, LK=4, the LK optical signals are provided over $\lambda_1, \ldots, \lambda_4$, each of the LK optical signals is provided at a data rate of 2.5 Gb/s, and $\lambda_{OC} = \lambda_5$, where $\lambda_5$ is different from any of $\lambda_1, \ldots, \lambda_4$. It is however appreciated that $\lambda_5$ may alternatively be any one of $\lambda_1, \ldots, \lambda_4$.

Preferably, each optical regeneration gate in the first set of LK optical regeneration gates 610 receives a respective one of the four optical signals and an OC signal at $\lambda_5$ and outputs to the coupler 620 chopped bits of the respective one of the four optical signals over $\lambda_5$ at a different time window. The coupler 620 preferably combines the chopped bits corresponding to the four optical signals to form a compacted optical signal carried over $\lambda_5$ at 10 Gb/s. The coupler then preferably provides the compacted optical signal at 10 Gb/s to the OMC 630 for storage therein for a period of time.

On retrieval from the OMC 630, the compacted optical signal at 10 Gb/s is decoupled by the decoupler 650 into four pattern replicas of the compacted optical signal that are each carried over, for example, $\lambda_{OUT} = \lambda_5$. The second set of LK optical regeneration gates 660 preferably receives the four pattern replicas of the compacted optical signal and regenerates the four optical signals at 2.5 Gb/s, for example in a respective form over $\lambda_1, \ldots, \lambda_4$.

Figure 6:
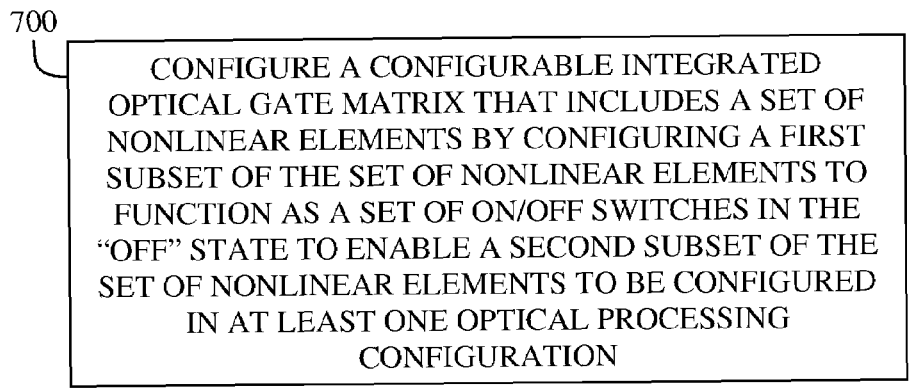
FIG. 6 is a simplified flowchart illustration of a preferred method of operation of the optical gate matrix of FIG. 1.

Reference is now made to FIG. 6 which is a simplified flowchart illustration of a preferred method of operation of the optical gate matrix 10 of FIG. 1.

A configurable integrated optical gate matrix that includes a set of nonlinear elements is preferably configured (step 700) by configuring a first subset of the set of nonlinear elements to function as a set of ON/OFF switches in the "OFF" state to enable a second subset of the set of nonlinear elements to be configured in at least one optical processing configuration. The second subset of the set of nonlinear elements may then preferably be configured in the at least one optical processing configuration.

The at least one optical processing configuration may preferably include at least one of the following configurations: a configuration for all-optical 2R regeneration; a configuration for all-optical 3R regeneration; a configuration for wavelength conversion; a configuration for data format conversion; a configuration for demultiplexing; a configuration for clock recovery; a configuration for a logic operation; and a configuration for dispersion compensation.

It is appreciated that at least one of the following may preferably be programmably selected: a number of nonlinear elements in the first subset; a number of nonlinear elements in the second subset; a distribution of the nonlinear elements in the first subset; and a distribution of the nonlinear elements in the second subset. Furthermore, the set of nonlinear elements may be arranged essentially in a parallelogram matrix or a plurality of parallelogram matrices. The first subset may be configured to include nonlinear elements in a slant row of a parallelogram, or nonlinear elements in a parallelogram row separating parallelogram rows including nonlinear elements in the second subset. It is appreciated that the second subset may, for example, include nonlinear element configurations outputting at least some optical signals in essentially opposite directions.

Figure 7:
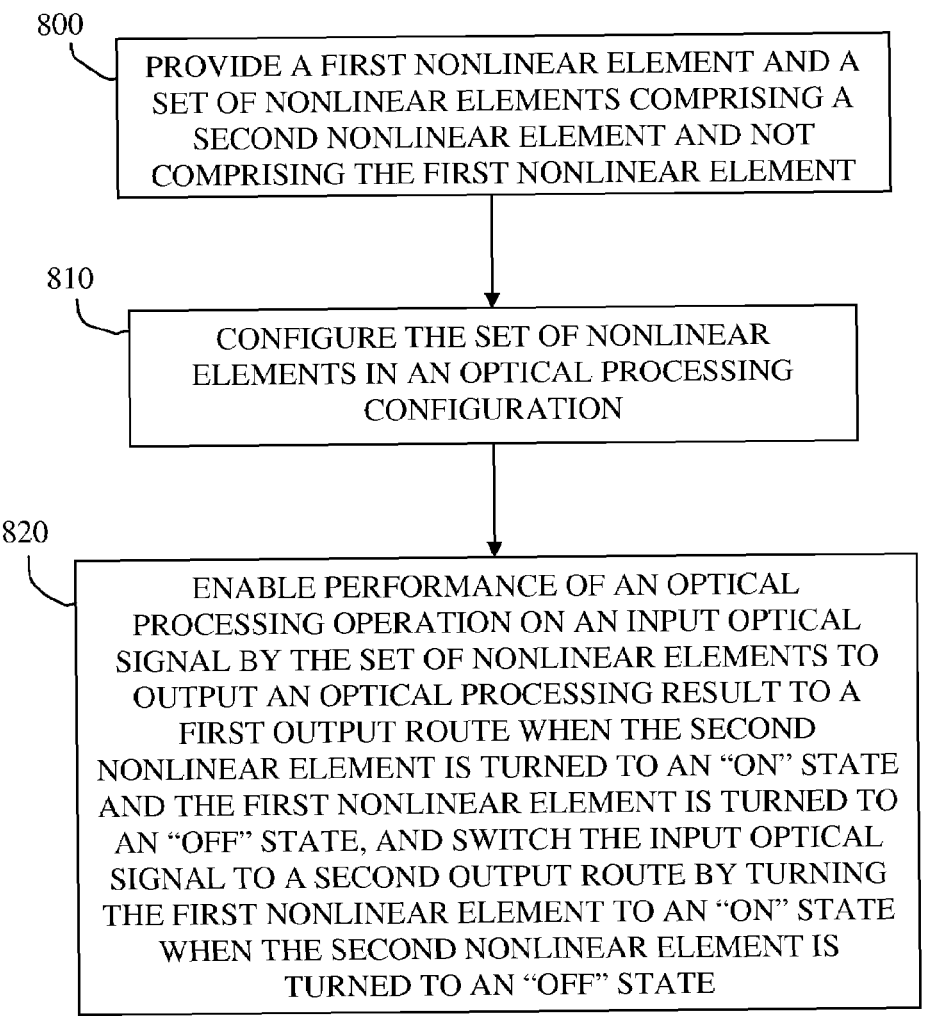
FIG. 7 is a simplified flowchart illustration of a preferred method of operation of the photonic device of FIG. 2.

Reference is now made to FIG. 7 which is a simplified flowchart illustration of a preferred method of operation of the photonic device 200 of FIG. 2.

A first nonlinear element and a set of nonlinear elements comprising a second nonlinear element and not comprising the first nonlinear element are preferably provided (step 800). The set of nonlinear elements is preferably configured (step 810) in an optical processing configuration.

An input optical signal may then preferably selectively undergo an optical processing operation and a switching operation (step 820) by enabling performance of the optical processing operation on the input optical signal by the set of nonlinear elements for outputting an optical processing result to a first output route when the second nonlinear element is turned to an "ON" state and the first nonlinear element is turned to an "OFF" state, and switching the input optical signal to a second output route by turning the first nonlinear element to an "ON" state when the second nonlinear element is turned to an "OFF" state.

It is appreciated that the optical processing operation may preferably include at least one of the following: all-optical 2R regeneration; all-optical 3R regeneration; wavelength conversion; data format conversion; demultiplexing; clock recovery; a logic operation; and dispersion compensation. The first output route and the second output route may preferably be spatially and/or directionally separated.

Figure 8:
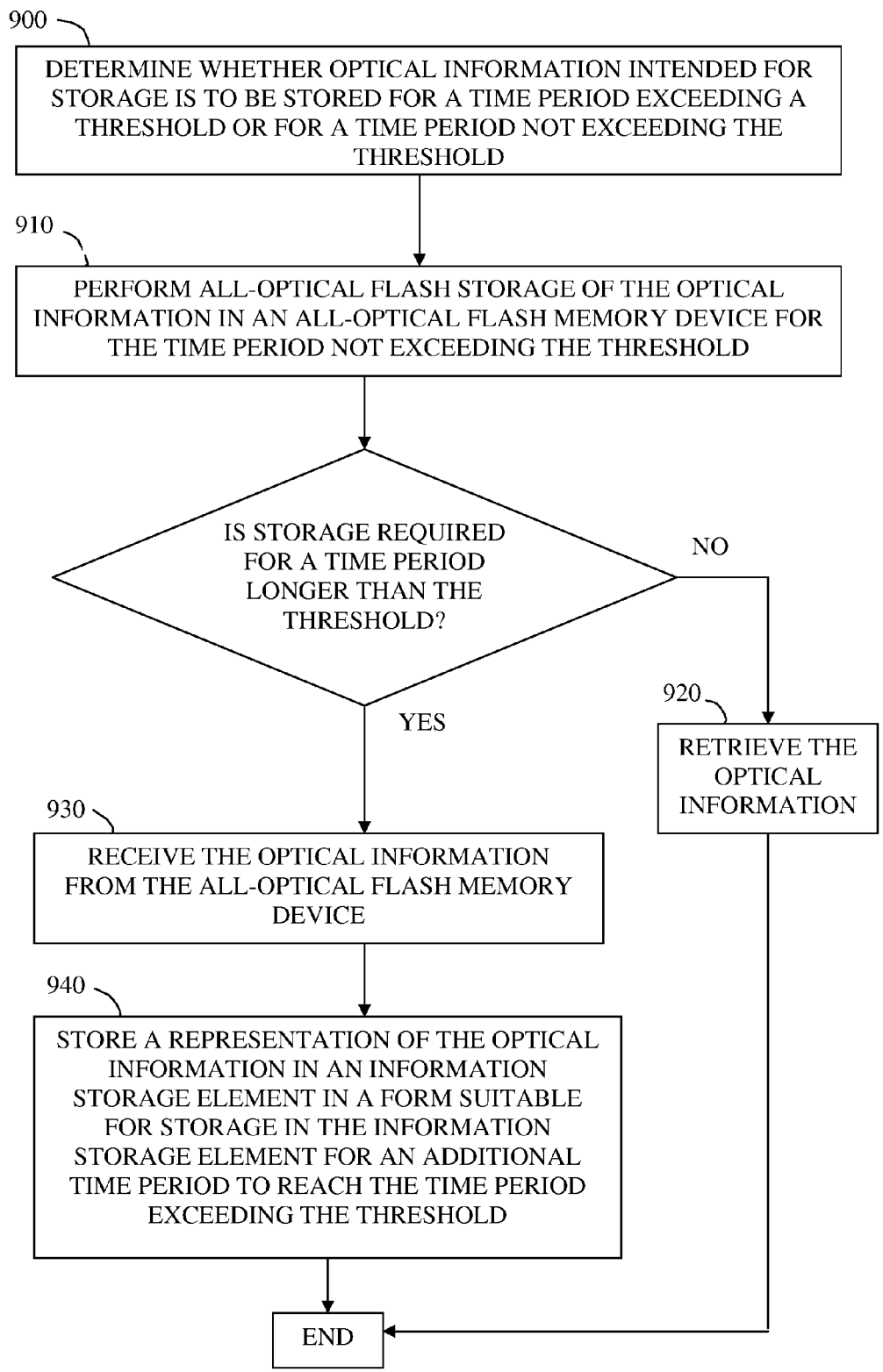
FIG. 8 is a simplified flowchart illustration of a preferred method of operation of the memory unit of FIG. 3.

Reference is now made to FIG. 8 which is a simplified flowchart illustration of a preferred method of operation of the memory unit 400 of FIG. 3.

Preferably, a determination is provided (step 900) of whether optical information intended for storage is to be stored for a time period exceeding a threshold or for a time period not exceeding the threshold. The optical information then preferably undergoes all-optical flash storage in an all-optical flash memory device for the time period not exceeding the threshold (step 910).

If the optical information is to be stored for the time period not exceeding the threshold, the optical information may preferably be retrieved (step 920) after termination of the all-optical flash storage.

If, however, the optical information is to be stored for the time period exceeding the threshold, the optical information is preferably received (step 930) from the all-optical flash memory device, and a representation of the optical information is preferably stored (step 940) in an information storage element in a form suitable for storage in the information storage element for an additional time period to reach the time period exceeding the threshold.

Figure 9:
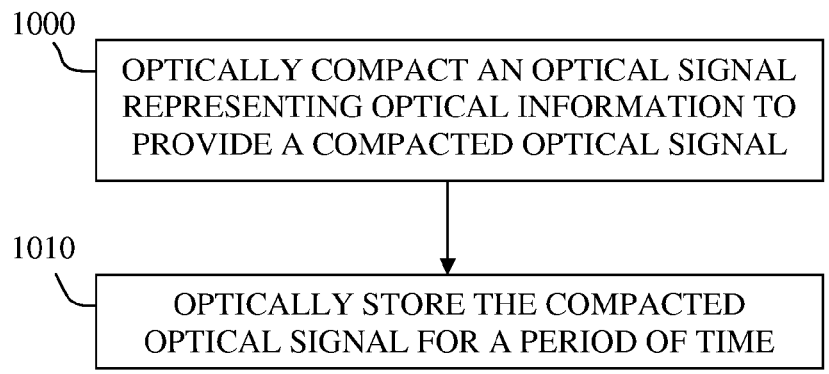
FIG. 9 is a simplified flowchart illustration of a preferred method of operation of the all-optical memory device of FIG. 4.

Reference is now made to FIG. 9 which is a simplified flowchart illustration of a preferred method of operation of the all-optical memory device 500 of FIG. 4.

Preferably, an optical signal representing optical information is optically compacted (step 1000) to provide a compacted optical signal. The compacted optical signal is then preferably optically stored (step 1010) for a period of time.

Figure 10:
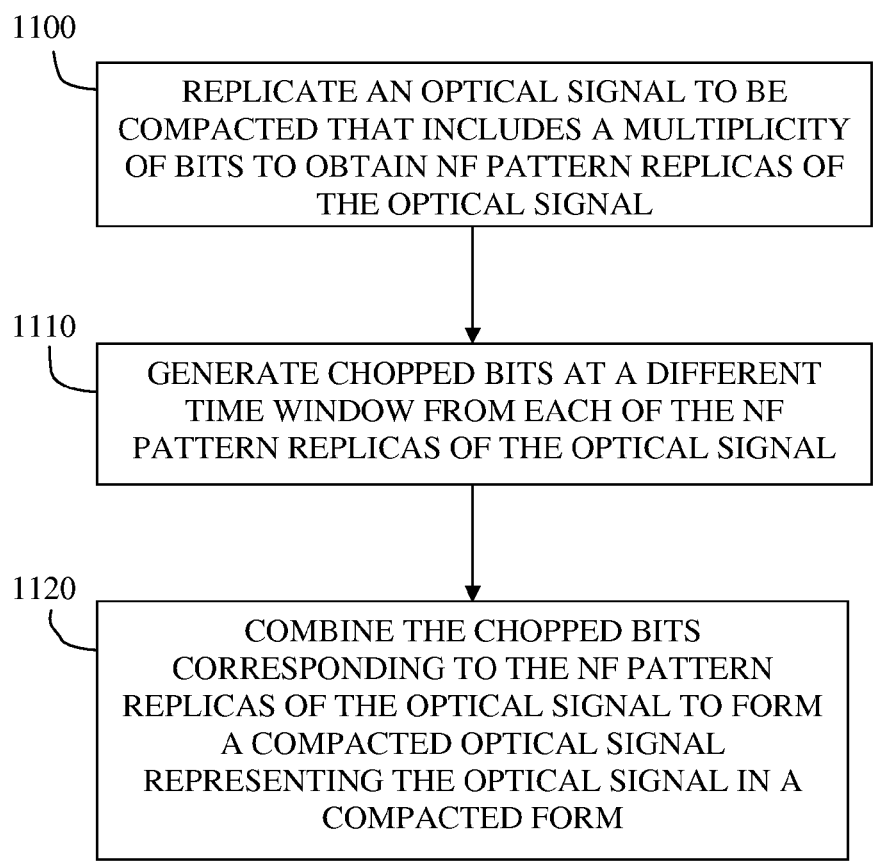
FIG. 10 is a simplified flowchart illustration of a preferred method of operation of an optical compactor in the all-optical memory device of FIG. 4.

Reference is now made to FIG. 10 which is a simplified flowchart illustration of a preferred method of operation of the optical compactor 510 in the all-optical memory device 500 of FIG. 4.

Preferably, an optical signal comprising a multiplicity of bits is replicated (step 1100) to obtain NF pattern replicas of the optical signal, where NF is an integer greater than one. Then, chopped bits at a different time window are generated (step 1110) from each of the NF pattern replicas of the optical signal. The chopped bits corresponding to the NF pattern replicas of the optical signal are preferably combined (step 1120) to form a compacted optical signal representing the optical signal in a compacted form.

Reference is now made to FIG. 11 which is a simplified flowchart illustration of a preferred method of operation of the all-optical memory device 600 of FIG. 5.

Preferably, chopped bits over a wavelength $\lambda_{OC}$ at a different time window are generated (step 1200) from each of LK optical signals that are respectively carried over LK separate carrier wavelengths $\lambda_1, \ldots, \lambda_{LK}$ and an OC signal at $\lambda_{OC}$, where LK is an integer greater than one and $\lambda_{OC}$ of the OC signal is preferably pre-selected. The chopped bits corresponding to the LK optical signals are preferably combined (step 1210) to form a compacted optical signal representing a combination of the LK optical signals in a compacted form for storing the compacted optical signal for a period of time.

It is appreciated that on retrieval, the compacted optical signal is decoupled into LK pattern replicas of the compacted optical signal that are each carried over a wavelength $\lambda_{OUT}$, where $\lambda_{OUT}$ may, for example, be equal to $\lambda_{OC}$. The LK optical signals may then be regenerated over LK separate wavelengths $\lambda'_1, \ldots, \lambda'_{LK}$ from the LK pattern replicas of the compacted optical signal and LK optical-clock signals carried over $\lambda'_1, \ldots, \lambda'_{LK}$, where $\lambda'_1, \ldots, \lambda'_{LK}$ may, for example, be the same as $\lambda_1, \ldots, \lambda_{LK}$.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the claims that follow:

What is claimed is:

1. A memory unit for storing optical information, the memory unit comprising:
   a controller operative to determine whether the optical information is to be stored for a time period exceeding a threshold or for a time period not exceeding the threshold;
   an all-optical flash memory device operatively associated with the controller and operative to perform all-optical flash storage of the optical information for the time period not exceeding the threshold;

an information storage element operatively associated with the all-optical flash memory device and the controller and operative, if the optical information is to be stored for the time period exceeding the threshold, to receive the optical information from the all-optical flash memory device, and to store a representation of the optical information in a form suitable for storage in the information storage element for an additional time period to reach the time period exceeding the threshold; and an optical interface operatively associated with a driver, the controller and the all-optical flash memory device and capable of converting said optical information into said form suitable for storage in the information storage element and vice versa, the controller further operative to control the all-optical flash memory device to provide the optical information to the information storage element to allow the all-optical flash memory device to accept other optical information.

2. The memory unit according to claim 1 and wherein the information storage element comprises at least one of the following storage media:
- a magnetic memory media;
- an electronic memory media;
- a magneto-optic memory media;
- a ferroelectric memory media;
- a magnetoresistive memory media;
- an Ovonic Unified Memory (OUM) media;
- a compact-disc (CD) media; and
- a digital versatile disc (DVD) media.

3. The memory unit according to claim 1 and also comprising:
the driver operatively controlled by the controller.

4. The memory unit according to claim 3 and wherein said optical interface comprises an optical transceiver.

5. The memory unit according to claim 1 and wherein the threshold indicates one of the following:
a maximum storage time attainable in the all-optical flash memory device; and
an optimum storage time attainable in the all-optical flash memory device.

6. The memory unit according to claim 1 and wherein the all-optical flash memory device is also operative to perform an optical processing operation on the optical information upon retrieval from the all-optical flash memory device.

7. The memory unit according to claim 1 and wherein said all-optical flash memory device is capable of storing at least one of the following: an optical signal that comprises a plurality of bits; and an optical packet that comprises at least one bit.

8. A method for storing optical information, the method comprising:
determining whether the optical information is to be stored for a time period exceeding a threshold or for a time period not exceeding the threshold;
performing all-optical flash storage of the optical information in an all-optical flash memory device for the time period not exceeding the threshold; and
if the optical information is to be stored for the time period exceeding the threshold;
providing the optical information to an information storage element to allow the all-optical flash storage element to allow the all-optical flash memory device to accept other optical information;
receiving the optical information from the all-optical flash memory device;
converting said optical information into a form suitable for storage in the information storage element; and
storing a representation of the optical information in the information storage element in the form suitable for storage in the information storage element for an additional time period to reach the time period exceeding the threshold.

9. The method according to claim 8 and wherein the threshold indicates one of the following: a maximum storage time attainable in the all-optical flash memory device; and an optimum storage time attainable in the all-optical flash memory device.

* * * * *